(12) United States Patent
Yang et al.

(10) Patent No.: US 12,543,085 B2
(45) Date of Patent: Feb. 3, 2026

(54) CELL MEASUREMENT METHOD, APPARATUS, AND SYSTEM

(71) Applicant: HUAWEI TECHNOLOGIES CO., LTD., Guangdong (CN)

(72) Inventors: Rui Yang, Beijing (CN); Fenghui Dou, Beijing (CN); Hui Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 427 days.

(21) Appl. No.: 18/044,427

(22) PCT Filed: Sep. 6, 2021

(86) PCT No.: PCT/CN2021/116721
§ 371 (c)(1),
(2) Date: Mar. 8, 2023

(87) PCT Pub. No.: WO2022/052890
PCT Pub. Date: Mar. 17, 2022

(65) Prior Publication Data
US 2023/0362762 A1 Nov. 9, 2023

(30) Foreign Application Priority Data

Sep. 10, 2020 (CN) .......................... 202010948148.3

(51) Int. Cl.
*H04W 36/00* (2009.01)
*H04W 36/08* (2009.01)
*H04W 36/30* (2009.01)

(52) U.S. Cl.
CPC . *H04W 36/0085* (2018.08); *H04W 36/00837* (2018.08); *H04W 36/08* (2013.01); *H04W 36/302* (2023.05)

(58) Field of Classification Search
CPC ............. H04W 36/08; H04W 36/0085; H04W 36/00837; H04W 36/302
See application file for complete search history.

(56) References Cited

U.S. PATENT DOCUMENTS

| 8,909,229 B2* | 12/2014 | Martin ................ H04W 36/249 370/335 |
| 2013/0084866 A1* | 4/2013 | Martin .................. H04W 24/10 455/436 |

(Continued)

FOREIGN PATENT DOCUMENTS

| CN | 104303551 A | 1/2015 |
| CN | 110856205 A | 2/2020 |

*Primary Examiner* — Melanie Jagannathan
(74) *Attorney, Agent, or Firm* — Fish & Richardson P.C.

(57) ABSTRACT

The present disclosure relates to cell measurement methods and devices. In one example method, a user equipment determines at least one first neighboring cell belonging to a first priority and/or at least one second neighboring cell belonging to a second priority among at least one neighboring cell adjacent to a serving cell of the user equipment, where the first priority is lower than the second priority. When the at least one neighboring cell includes the at least one first neighboring cell, the user equipment determines that a cell measurement policy includes measuring the at least one first neighboring cell in a plurality of discontinuous reception (DRX) cycles, where a time interval between two adjacent measurements on the first neighboring cell is greater than or equal to one DRX cycle. The user equipment measures the at least one neighboring cell according to the cell measurement policy.

20 Claims, 13 Drawing Sheets

(56) References Cited

U.S. PATENT DOCUMENTS

| | | | | |
|---|---|---|---|---|
| 2015/0304928 A1* | 10/2015 | Lu | .................... | H04W 36/324 |
| | | | | 455/67.11 |
| 2015/0350976 A1* | 12/2015 | Kodali | ................ | H04W 76/28 |
| | | | | 455/440 |
| 2016/0330660 A1* | 11/2016 | Wong | ................ | H04W 36/302 |
| 2016/0337931 A1* | 11/2016 | Wang | ................ | H04W 48/20 |
| 2017/0164250 A1* | 6/2017 | Kim | .................... | H04W 88/02 |
| 2019/0268819 A1* | 8/2019 | Kim | ................ | H04W 36/0058 |
| 2021/0144603 A1* | 5/2021 | Bansal | ................ | H04W 48/20 |
| 2021/0345201 A1* | 11/2021 | Cheng | ................ | H04W 24/10 |

* cited by examiner

CELL MEASUREMENT METHOD, APPARATUS, AND SYSTEM

CROSS REFERENCE TO RELATED APPLICATIONS

This application is a national stage of International Application No. PCT/CN2021/116721, filed on Sep. 6, 2021, which claims priority to Chinese Patent Application No. 202010948148.3, filed on Sep. 10, 2020. Both of the aforementioned applications are incorporated herein by reference in their entireties.

TECHNICAL FIELD

The present invention relates to the field of wireless communication technologies, and in particular, to a cell measurement method, apparatus, and system, which are used for a serving cell handover and the like.

BACKGROUND

User equipment (for example, a mobile phone) that can implement a wireless communication function usually includes a modem, configured to perform conversion (that is, modulation and demodulation) between standards of different signals according to a communication protocol (for example, a wireless communication protocol formulated by the 3rd Generation Partnership Project (3GPP)). Usually, power consumption of the modem may account for a majority (for example, 64%) of power consumption of the entire user equipment, and power consumption of the modem used for a cell measurement and a cell handover (that is, a network selection process) may account for about 30% of the power consumption of the entire user equipment. Usually, to save power consumption, cells to be measured are classified into high-priority cells and low-priority cells. In each discontinuous reception (DRX) cycle, the modem measures each high-priority cell once, and measures only one low-priority cell in each DRX cycle. In this way, the power consumption is reduced by controlling a quantity of low-priority cells measured in each DRX cycle.

Herein, the high-priority cell may include a cell with high stability. For example, the user equipment camps on the cell for a long time, the user equipment is less handed over from the cell to another cell, or vice versa (that is, few ping-pong handovers), and/or strength of a signal received through the cell is strong. On the contrary, the low-priority cell may include a cell with poor stability. For example, the user equipment camps on the cell for a short time, the user equipment is handed over from the cell to another cell more frequently, or vice versa (that is, more ping-pong handovers), and/or strength of a signal received through the cell is weak.

FIG. 11 and FIG. 12 respectively show measurement time sequence diagrams for measuring two recommended low-priority cells and one recommended low-priority cell when the low-priority cell is recommended according to the conventional technology. A quantity of recommended low-priority cells shown in the figure is merely used as an example. A person skilled in the art should understand that another quantity of low-priority cells may also be recommended. Because only one low-priority cell is measured in each DRX cycle, when two low-priority cells are recommended, the two low-priority cells are measured in turn in a plurality of DRX cycles (as shown in FIG. 11), or when one low-priority cell is recommended, a same low-priority cell is measured in each DRX cycle (as shown in FIG. 12). It can be learned that a low-priority cell measurement needs to be performed once in each DRX cycle. Therefore, a quantity of measurement times is not reduced, and power consumption cannot be further reduced.

SUMMARY

This application provides a cell measurement method, apparatus, and system.

According to a first aspect of this application, a cell measurement method used for user equipment includes: determining a first neighboring cell belonging to a first priority and a second neighboring cell belonging to a second priority among neighboring cells of the user equipment, where the first priority is lower than the second priority; measuring the first neighboring cell by using a first measurement policy, where a time interval between two adjacent measurements on the first neighboring cell is greater than or equal to one discontinuous reception DRX cycle; and measuring the second neighboring cell by using a second measurement policy, where the measuring the second neighboring cell by using a second measurement policy includes: measuring second neighboring cells whose quantity is not greater than a predetermined quantity.

According to a second aspect of this application, before the determining a first neighboring cell belonging to a first priority and a second neighboring cell belonging to a second priority among neighboring cells of the user equipment, the method further includes: obtaining information of a cell set related to the user equipment, where the cell set includes a serving cell and a plurality of neighboring cells of the user equipment; selecting at least one neighboring cell from the plurality of neighboring cells based on the information of the cell set; and the determining a first neighboring cell belonging to a first priority and a second neighboring cell belonging to a second priority among neighboring cells of the user equipment includes: determining the first neighboring cell and the second neighboring cell from the at least one neighboring cell.

According to a third aspect of this application, the measuring the first neighboring cell by using a first measurement policy includes: measuring, within each measurement period, a preset quantity of neighboring cells selected from the first neighboring cell for a preset quantity of times.

According to a fourth aspect of this application, the first measurement policy includes: when a quantity of first neighboring cells is greater than or equal to 2, the time interval is equal to N-1 DRX cycles, where N is the quantity of the first neighboring cells; or the time interval between the two adjacent measurements on the first neighboring cell is the same as or different from a time interval between another two adjacent measurements on the first neighboring cell.

According to a fifth aspect of this application, the time interval is related to signal strength, the greater signal strength indicates the longer time interval between the two adjacent measurements on the first neighboring cell, and the smaller signal strength indicates the shorter time interval between the two adjacent measurements on the first neighboring cell.

According to a sixth aspect of this application, that the time interval is related to signal strength includes: when the signal strength is between a measurement start threshold and a middle threshold, determining that the time interval between the two adjacent measurements on the first neighboring cell is a first time interval, where the middle threshold is equal to an average value of the measurement start threshold and an escape threshold; and when the signal strength is between the middle threshold and the escape threshold, determining that the time interval between the two adjacent measurements on the first neighboring cell is a second time interval, where the first time interval is greater than the second time interval, where the measurement start threshold is set to start a cell measurement when the signal strength is less than the measurement start threshold, and the escape threshold is set to perform the cell measurement in a default manner when the signal strength is less than the escape threshold.

According to a seventh aspect of this application, the method further includes: skipping a cell measurement when the signal strength is greater than a measurement start threshold; and measuring the neighboring cell according to a third measurement interval when the signal strength is less than an escape threshold, where the third measurement interval is less than the time interval in the first measurement policy.

According to an eighth aspect of this application, the method further includes: sorting cells in descending order of stability based on at least one of the following parameters, where the cell includes the serving cell and/or the neighboring cell: a length of camp-on duration of the user equipment in each cell; strength of a signal received by the user equipment from each cell; and a quantity of connection handovers between the user equipment and each cell, where the longer camp-on duration indicates the higher stability of the cell; the stronger signal strength indicates the higher stability of the cell; and the smaller quantity of the connection handovers indicates the higher stability of the cell; and the selecting at least one neighboring cell from the plurality of neighboring cells includes: selecting, from the plurality of neighboring cells, a preset quantity of top-ranking neighboring cells in descending order of stability.

According to a ninth aspect of this application, the measuring second neighboring cells whose quantity is not greater than a predetermined quantity includes: comparing a quantity of second neighboring cells with a second-priority cell threshold; when the quantity of the second neighboring cells is greater than the first quantity, determining the first quantity of second neighboring cells from the second neighboring cell for a measurement, where the predetermined quantity is equal to the first quantity; and when a quantity of at least one second neighboring cell is less than or equal to the first quantity, performing a measurement on all the second neighboring cells, where the predetermined quantity is the quantity of the second neighboring cells.

According to a tenth aspect of this application, the method further includes: determining that a location of the user equipment changes, and/or signal strength of a signal received by the user equipment through the serving cell is less than a threshold; and if a cell measurement policy is not obtained within a predetermined time period, measuring the neighboring cell within a plurality of DRX cycles, and determining, based on a quantity of neighboring cells, a measurement interval for measuring the neighboring cell.

According to an eleventh aspect of this application, the measuring the first neighboring cell by using a first measurement policy further includes: measuring, in a power saving mode, the first neighboring cell by using the first measurement policy; and the measuring the second neighboring cell by using a second measurement policy further includes: measuring, in the power saving mode, the second neighboring cell by using the second measurement policy.

According to the foregoing method, a quantity of neighboring cells that need to be measured may be reduced, a quantity of neighboring cells that belong to a high priority and that are measured in each DRX cycle may be reduced, or a measurement period of a neighboring cell belonging to a low priority may be prolonged or a time interval between two adjacent measurements on the neighboring cell belonging to the low priority may be prolonged, and any combination of the foregoing manners, to reduce measurement power consumption.

According to a twelfth aspect of this application, a cell measurement method used for user equipment includes: determining a first neighboring cell belonging to a first priority and/or a second neighboring cell belonging to a second priority among neighboring cells of the user equipment, where the first priority is lower than the second priority; and when the neighboring cell includes the first neighboring cell, determining that a cell measurement policy includes measuring at least one first neighboring cell in a plurality of discontinuous reception (DRX) cycles, where a time interval between two adjacent measurements on the first neighboring cell is greater than or equal to one DRX cycle.

According to a thirteenth aspect of this application, the method further includes: obtaining information of a cell set related to the user equipment, where the cell set includes a serving cell and a plurality of neighboring cells adjacent to the serving cell; and selecting at least one neighboring cell from the plurality of neighboring cells based at least in part on the information of the cell set.

According to a fourteenth aspect of this application, each of the two adjacent measurements on the first neighboring cell is used to measure one first neighboring cell of the at least one first neighboring cell once within one DRX cycle of the plurality of DRX cycles, and there is no another measurement on the first neighboring cell between the two adjacent measurements on the first neighboring cell.

According to a fifteenth aspect of this application, when a quantity of the at least one first neighboring cell is greater than or equal to 2, the time interval is equal to N-1 DRX cycles, where N is the quantity of the first neighboring cell; or the time interval between the two adjacent measurements on the first neighboring cell is the same as or different from a time interval between another two adjacent measurements on the first neighboring cell.

According to a sixteenth aspect of this application, the method further includes: determining that signal strength of a signal received by the user equipment through the serving cell is between a measurement start threshold and an escape threshold.

According to a seventeenth aspect of this application, the time interval is related to signal strength, the greater signal strength indicates the longer time interval between the two adjacent measurements on the first neighboring cell, and the smaller signal strength indicates the shorter time interval between the two adjacent measurements on the first neighboring cell.

According to an eighteenth aspect of this application, the time interval is related to the signal strength, and the method further includes: when the signal strength is between a measurement start threshold and a middle threshold, determining that the time interval between the two adjacent measurements on the first neighboring cell is a first time interval, where the middle threshold is equal to an average value of the measurement start threshold and an escape threshold; and when the signal strength is between the middle threshold and the escape threshold, determining that the time interval between the two adjacent measurements on the first neighboring cell is a second time interval, where the first time interval is greater than the second time interval.

According to a nineteenth aspect of this application, the method further includes: when the signal strength is greater than the measurement start threshold, determining that the cell measurement policy includes skipping measuring the at least one neighboring cell; and when the signal strength is less than the escape threshold, determining that the cell measurement policy includes measuring the at least one first neighboring cell in the plurality of DRX cycles, where a time interval between every two adjacent measurements on the first neighboring cell is 0.

According to a twentieth aspect of this application, the selecting at least one neighboring cell from the plurality of neighboring cells based at least in part on the information of the cell set further includes: determining a location of the user equipment based on the information of the cell set; obtaining a cell list related to the location based on the location of the user equipment; and selecting the at least one neighboring cell from the plurality of neighboring cells, where the at least one neighboring cell is located in the cell list.

According to a twenty-first aspect of this application, the cell list sorts cells in descending order of stability based on at least one of a length of camp-on duration of the user equipment in each cell related to the location, strength of a signal received by the user equipment from each cell, and a quantity of connection handovers between the user equipment and each cell, where the longer camp-on duration indicates the stronger signal strength, and the smaller quantity of connection handovers indicates the higher stability of the cell.

According to a twenty-second aspect of this application, the selecting at least one neighboring cell from the plurality of neighboring cells further includes: selecting, from the plurality of neighboring cells, the at least one neighboring cell that is ranked in descending order of stability and that is in the cell list.

According to a twenty-third aspect of this application, the method further includes: when the at least one neighboring cell includes at least one second neighboring cell, comparing a quantity of the at least one second neighboring cell with a second-priority cell threshold; when the quantity of the at least one second neighboring cell is greater than the second-priority cell threshold, determining, in each DRX cycle of the plurality of DRX cycles, that the cell measurement policy includes measuring the second neighboring cell whose quantity is a quantity of second-priority cell thresholds; and when the quantity of the at least one second neighboring cell is less than or equal to the second-priority cell threshold, determining, in each DRX cycle, that the cell measurement policy includes measuring the second neighboring cell whose quantity is the quantity of the at least one second neighboring cell.

According to a twenty-fourth aspect of this application, the measuring the second neighboring cell whose quantity is a quantity of second-priority cell thresholds further includes: selecting, from the at least one second neighboring cell, the second neighboring cell that is ranked in descending order of stability in the cell list and whose quantity is the quantity of the second-priority thresholds.

According to a twenty-fifth aspect of this application, the method further includes: determining that the location of the user equipment changes, and/or the signal strength of the signal received by the user equipment through the serving cell is less than a threshold; and if the cell measurement policy is not obtained within a predetermined time period and when the at least one neighboring cell includes the at least one first neighboring cell, measuring the at least one first neighboring cell within the plurality of DRX cycles, where the time interval between the two adjacent measurements on the first neighboring cell is greater than or equal to one DRX cycle.

According to a twenty-sixth aspect of this application, the method further includes: when the at least one neighboring cell includes the at least one second neighboring cell, measuring the at least one second neighboring cell in each DRX cycle of the plurality of DRX cycles.

According to a twenty-seventh aspect of this application, the method further includes: determining that a cell measurement is related to an optimal power consumption mode.

According to a twenty-eighth aspect of this application, the information of the cell set includes at least one of an identifier of the serving cell, identifiers of the plurality of neighboring cells, the signal strength of the signal received by the user equipment through the serving cell, or a hotspot physical address obtained by a Wi-Fi module of the user equipment.

DESCRIPTION OF EMBODIMENTS

Figure 1:
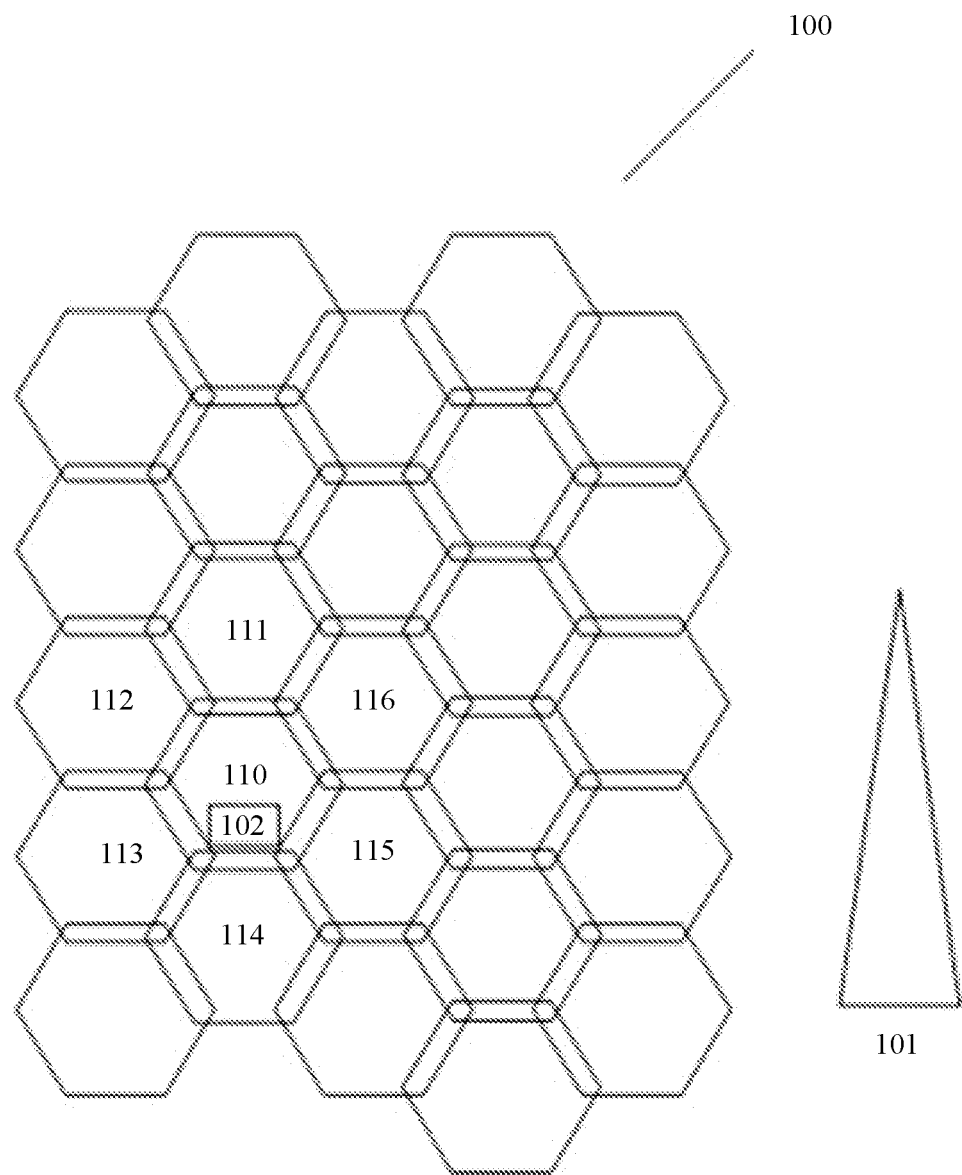
FIG. 1 shows a cell measurement and handover system according to some embodiments of this application.

The following describes implementations of this application by using specific embodiments. A person skilled in the art may easily learn of other advantages and effects of this application based on content disclosed in this specification.

Although this application is described with reference to preferred embodiments, this does not mean that features of the present invention are limited only to the implementations. On the contrary, a purpose of describing the present invention with reference to the implementations is to cover other selections or modifications that may be derived based on the claims of this application. To provide an in-depth understanding of this application, the following descriptions include a plurality of specific details. This application may be alternatively implemented without using these details. In addition, to avoid confusion or blurring a focus of this application, some specific details are omitted from the description. It should be noted that embodiments in this application and the features in embodiments may be mutually combined in the case of no conflict.

Furthermore, various operations will be described as a plurality of discrete operations in a manner that is most conducive to understanding illustrative embodiments. However, a described order should not be construed as implying that these operations need to depend on the order. In particular, these operations do not need to be performed in the rendered order. It should be noted that, in this specification, reference numerals and letters in the following accompanying drawings represent similar items. Therefore, once an item is defined in an accompanying drawing, the item does not need to be further defined or interpreted in the following accompanying drawings.

It should be understood that although terms such as "first" and "second" may be used herein to describe various features, these features should not be limited by these terms. These terms are merely used for distinction, and shall not be understood as an indication or implication of relative importance. For example, without departing from the scope of the example embodiments, a first feature may be referred to as a second feature, and similarly the second feature may be referred to as the first feature.

Unless otherwise stated, terms "contain", "have", and "include" are synonymous. A phrase "A/B" indicates "A or B". The phrase "A and/or B" indicates "(A), (B), or (A and B)".

As used herein, a term "module", "unit", or "apparatus" may be or include an application-specific integrated circuit (ASIC), an electronic circuit, a processor (shared, dedicated, or group) that executes one or more software or firmware programs and/or a memory (shared, dedicated, or group), combined logic circuits, and/or another suitable component that provides a described function, or may be a part of an application-specific integrated circuit (ASIC), an electronic circuit, a processor (shared, dedicated, or group) that executes one or more software or firmware programs and/or a memory (shared, dedicated, or group), combined logic circuits, and/or another suitable component that provides the described function.

To make objectives, technical solutions, and advantages of this application clearer, the following further describes embodiments of this application in detail with reference to the accompanying drawings.

FIG. 1 shows a cell measurement and handover system according to some embodiments of this application. As shown in FIG. 1, a system 100 includes a base station 101 and user equipment 102. The base station 101 is configured to connect the user equipment 102 to a wireless network according to a wireless communication protocol, for example, the 3GPP, 2G, 3G, 4G, 5G, or another future protocol, to support communication between the user equipment 102 and a core network (not shown in the figure) in the wireless network.

Examples of the user equipment 102 include, but are not limited to, a portable or mobile device, a mobile phone, a personal digital assistant, a cellular phone, a handheld PC, a wearable device (for example, a smartwatch or a smart band), a portable media player, a handheld device, a navigation device, a server, a network device, a graphics device, a video game device, a set-top box, a laptop device, a virtual reality and/or augmented reality device, an internet of things device, an industrial control device, an intelligent vehicle, an automotive infotainment device, a streaming media client device, an e-book, a reading device, a POS terminal, and another device.

As shown in FIG. 1, a coverage area of the base station 101 may be divided into a plurality of cells. For example, cells 110 to 116. Although a shape of the cells in the figure is a hexagonal honeycomb, a person skilled in the art should understand that the shape of the cells may vary with terrain, an object on the ground, or another factor. Usually, a cell on which the user equipment 102 currently camps and that can provide a service for the user equipment 102 is considered as a serving cell, for example, 110 in FIG. 1. In the coverage area of the base station 101, each cell is adjacent to another cell. For example, cells adjacent to the cell 110 include cells 111 to 116. When the cell 110 is used as the serving cell, the cells 111 to 116 adjacent to the cell 110 may be considered as neighboring cells of the serving cell 110.

A person skilled in the art should understand that, based on different terrains, objects on the ground, or other factors, the cells may overlap or may not overlap, and the user equipment 102 may be located in an overlapping area of a plurality of cells, or may be located in an area that is in one cell and that does not overlap with another cell. In addition, although the coverage area of the base station 101 in FIG. 1 includes a plurality of cells, a person skilled in the art should understand that the coverage area of the base station 101 may include any quantity of cells, for example, include one cell, that is, each cell may have its own base station. The serving cell is a cell that provides a service for a connection and a communication service between the user equipment 102 and a base station in the cell, and is usually a cell in which a location of the user equipment 102 is located.

According to some embodiments of this application, when the user equipment 102 just moves to the serving cell 110, or when strength of a signal received by the serving cell 110 of the user equipment 102 from the base station 101 is excessively low (for example, the signal strength is lower than a threshold), and communication quality is affected, the user equipment 102 may measure a neighboring cell (for example, one or more of the neighboring cells 111 to 116) of the serving cell 110, and determine, based on a measurement result, whether to hand over the serving cell from the cell 110 to one of the neighboring cells 111 to 116.

Before measuring the neighboring cell, the user equipment 102 may first determine a mode that a cell measurement should follow, for example, a power consumption priority mode or a performance priority mode. According to some embodiments of this application, in the power consumption priority mode, the user equipment 102 determines a cell measurement policy that can reduce power consumption required by a modem in the user equipment 102 for measuring the cell. In the performance priority mode, the user equipment 102 determines a cell measurement policy that can improve precision of measuring the cell by the modem.

In the case of the power consumption priority mode, the user equipment 102 measures neighboring cells (for example, the neighboring cells 111 to 116) according to the cell measurement policy. The cell measurement may reduce a quantity of measured neighboring cells within a measurement period (for example, a discontinuous reception (DRX) cycle), to save power consumption required by the modem (not shown in FIG. 1) in the user equipment 102 for measuring the neighboring cell. For example, the user equipment 102 may obtain a cell list by learning serving cells on which the user equipment 102 once camped at a same location, and the cell list lists the serving cells on which the user equipment 102 once camped at the location and stability rankings of the serving cells. The user equipment 102 selects, based on the cell list, a predetermined quantity of neighboring cells from the neighboring cells 111 to 116 of the current serving cell 110 as neighboring cells to be measured, to reduce a quantity of neighboring cells that need to be measured.

For another example, the user equipment 102 may classify the neighboring cells to be measured into high-priority neighboring cells and/or low-priority neighboring cells. A threshold is set for a quantity of high-priority neighboring cells that need to be measured in each DRX cycle, that is, high-priority neighboring cells whose quantity exceeds the threshold cannot be measured in each DRX cycle. For another example, the user equipment 102 may prolong a time interval between every two adjacent measurements on the low-priority neighboring cell. For example, if the time interval is set to one or more DRX cycles, the low-priority neighboring cell does not need to be measured in some DRX cycles. In this way, the power consumption required for measuring the neighboring cell can be further reduced. According some embodiments of this application, each measurement on the low-priority neighboring cell is used to measure one low-priority neighboring cell once within one DRX cycle of the plurality of DRX cycles, and there is no another measurement on the low-priority neighboring cell between every two adjacent measurements on the low-priority neighboring cell. When a quantity of low-priority neighboring cells is greater than or equal to 2, the time interval may be equal to N-1 DRX cycles, where N is equal to the quantity of the low-priority neighboring cells.

Although in the foregoing descriptions, the time interval between the every two adjacent measurements on the low-priority neighboring cell is the same, a person skilled in the art should understand that a time interval between two adjacent measurements on the low-priority neighboring cell may be the same as or different from a time interval between another two adjacent measurements on the low-priority neighboring cell. For example, a time interval between two adjacent measurements on the low-priority neighboring cell may be N-1 DRX cycles, and a time interval between two adjacent measurements on the low-priority neighboring cell may be 2N-1 DRX cycles.

The following specifically describes, with reference to FIG. 2 to FIG. 10, how the user equipment 102 determines the cell measurement policy, to reduce measurement power consumption.

Figure 2:
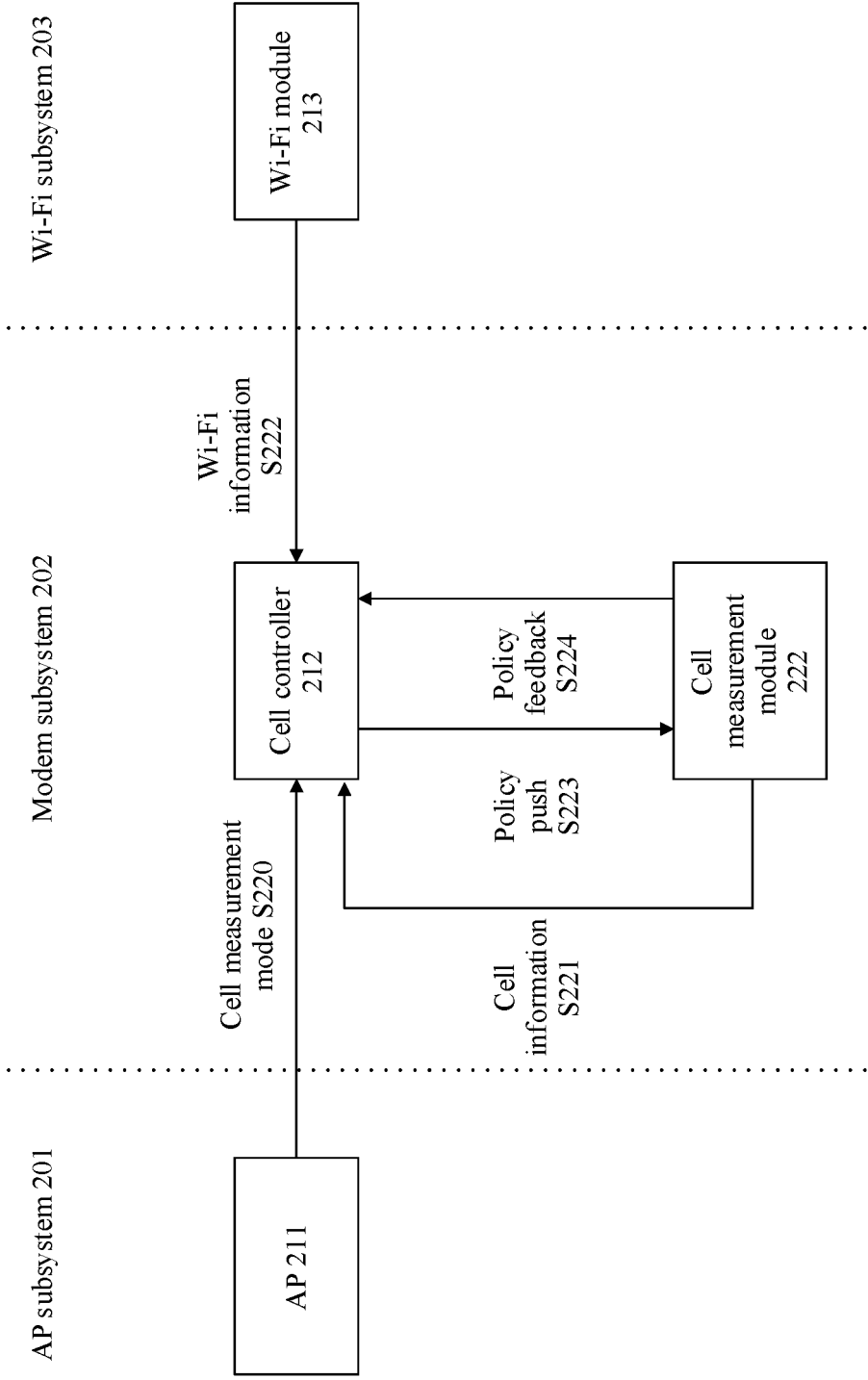
FIG. 2 is a block diagram of user equipment in the system in FIG. 1 according to some embodiments of this application.

FIG. 2 is a block diagram of user equipment in the system in FIG. 1 according to some embodiments of this application. As shown in FIG. 2, the user equipment 102 includes, but is not limited to, an application processor (AP) subsystem 201, a modem (modem) subsystem 202, a Wi-Fi subsystem 203, and/or another subsystem. The AP subsystem 201 may include one or more application processors (for example, an AP 211 in FIG. 2). Examples of the AP 211 may include, but are not limited to, one or more single-core or multi-core processors. In addition, the AP 211 may include any combination of a general-purpose processor and a dedicated processor (for example, a graphics processing unit, an application processor, or the like). The AP subsystem 201 may be coupled to a memory/storage apparatus or may include the memory/storage apparatus, and may be configured to run instructions stored in the memory/storage apparatus, so that various applications and/or operating systems can run on the user equipment 102. According to some embodiments of this application, the AP subsystem 201 sends a cell measurement mode to the modem subsystem 202. The cell measurement mode herein may include, but is not limited to, a power consumption priority mode, a performance priority mode, and/or another mode. In the power consumption priority mode, the user equipment 102 may determine a cell measurement policy that can reduce power consumption required by the modem subsystem 202 in the user equipment 102 for measuring a cell. In the performance priority mode, the user equipment 102 may determine a cell measurement policy that can improve precision of measuring the cell by the modem subsystem 202. The cell measurement mode may be determined by a setting performed by a user of the user equipment 102 on the user equipment 102 before the cell measurement, for example, setting a power saving mode when the user equipment 102 is powered on. The cell measurement mode may alternatively be determined through real-time interaction between a user interface of the user equipment 102 and the user. In addition, the cell measurement mode may further include coefficients related to the mode. For example, the cell measurement mode sent by the AP subsystem 201 to the modem subsystem 202 may include the power consumption priority mode, and a proportion of the power consumption required for the cell measurement to total power consumption. For example, in the conventional technology, power consumption of a modem in a standby mode, measuring the cell, and reselecting a serving cell accounts for about 30% of the total power consumption of the user equipment 102. In this case, according to some embodiments of this application, information of the cell measurement mode may further include a proportion of the power consumption required for the cell measurement to the total power consumption, for example, 10%.

The modem subsystem 202 may include a cell controller 212 and a cell measurement module 212 that are part of the modem (not shown in the figure). The modem is configured to perform conversion between standards of different signals according to a communication protocol (for example, a wireless communication protocol formulated by the 3GPP), to modulate a signal from the AP subsystem 201 into a baseband signal used for a radio frequency transmitter (not shown in the figure) of the user equipment 102, or demodulate a baseband signal from a radio frequency receiver (not shown in the figure) of the user equipment 102 into a signal that can be processed by the AP subsystem 201. In addition, the modem may further support various radio control functions of the radio frequency transmitter and the radio frequency receiver to communicate with one or more radio networks, including functions such as a cell measurement and a cell handover. The cell controller 212 and the cell measurement module 222 included in the modem subsystem 202 may be implemented by a third generation (3G) baseband processor, a fourth generation (4G) baseband processor, a fifth generation (5G) baseband processor, or memories of (one or more) other baseband processors used in other existing, under-development, or future generations (for example, a sixth generation (6G)), or may be implemented by a digital signal processor (DSP), a microcontroller, an application-specific integrated circuit (ASIC), or a microprocessor. The cell controller 212 and the cell measurement module may further be provided with a memory, configured to store instructions and data for executing functions of the cell controller 212 and the cell measurement module.

The cell controller 212 is configured to formulate a cell measurement policy that complies with a cell measurement mode when a serving cell handover condition is satisfied. The serving cell handover condition includes but is not limited to: Communication quality may be unstable because the user equipment 102 just enters a serving cell (for example, the cell 110 in FIG. 1), and the communication quality is affected because strength of a signal received by the user equipment 102 through the serving cell is excessively weak (for example, lower than a signal strength threshold), and/or another case that may result in a need to hand over the serving cell.

According to some embodiments of this application, when the cell measurement mode is set to the power consumption priority mode, the cell controller 212 may determine a cell measurement policy that complies with the mode. For example, a quantity of neighboring cells (for example, the neighboring cells 111 to 116 in FIG. 1) that need to be measured may be reduced, a quantity of neighboring cells that belong to a high priority and that are measured in each DRX cycle may be reduced, or a measurement period of a neighboring cell belonging to a low priority may be prolonged, another manner, any combination of the foregoing manners, and the like are used, to save the measurement power consumption.

The cell measurement module 222 is configured to measure the neighboring cell based on the cell measurement policy from the cell controller 212, and report a measurement result to the cell controller 212, so that the cell controller 212 may determine, based on the measurement result, whether to hand over a serving cell, for example, hand over the current serving cell from the cell 110 to the cell 111. Content of the foregoing measurement may include, but is not limited to, measuring strength (for example, reference signal received power (reference signal received power, RSRP)) of a signal received by the user equipment 102 through the neighboring cell, quality (for example, reference signal received quality (reference signal received quality, RSRQ)) of a signal received through the neighboring cell, and/or other content.

The Wi-Fi subsystem 203 is configured to establish a connection to a hotspot (not shown in the figure) of a wireless local area network according to the IEEE802.11X protocol, so that the user equipment 102 accesses the wireless local area network and communicates with another device in the wireless local area network. The Wi-Fi module 213 includes a Wi-Fi interface (not shown in the figure) configured to establish a connection to and communicate with the hotspot (not shown in the figure) and a Wi-Fi controller (not shown in the figure) that controls the Wi-Fi interface to access the wireless local area network through the hotspot (not shown in the figure) and communicate with another device in the network. According to some embodiments of this application, the Wi-Fi subsystem 203 is further configured to provide a media access control address (MAC) of the hotspot (not shown in the figure) for the cell controller 212, to help the cell controller 212 determine a current location of the user equipment 102, so that the cell controller 212 can obtain a cell list matching the current location. The list lists cells on which the user equipment 102 once camped at this location and sorts stability of the cells. Based on the cell list, the cell controller 212 may select a stable cell from the neighboring cells (for example, the cells 111 to 116) of the current serving cell (for example, the cell 110) as a neighboring cell that needs to be measured, to further reduce power consumption required for the cell measurement.

The following describes a process of performing a cell measurement and handover by the user equipment 102 in detail with reference to FIG. 2. According to some embodiments of this application, in step S220, the AP 211 sends a cell measurement mode to the cell controller 212. As described above, the cell measurement mode may include the power consumption priority mode, the performance priority mode, or another measurement mode. In the power consumption priority mode, power saving is a priority factor, and in the performance priority mode, performance improvement is a priority factor. As described above, in addition to a specific mode, the cell measurement mode may further include other information related to the mode, for example, coefficients related to the power consumption priority mode (for example, a target proportion of power consumption required for a cell measurement to total power consumption of the user equipment). When the cell measurement mode is the power consumption priority mode, in step S221, the cell measurement module 222 sends cell information to the cell controller 212. The cell information includes information of a cell set related to the user equipment 102, the cell set includes a serving cell (for example, the cell 110 in FIG. 1) at a location of the user equipment 102, and neighboring cells (for example, the neighboring cells 111 to 116 in FIG. 1) adjacent to the serving cell. The neighboring cell herein may include one or more of the neighboring cells adjacent to the serving cell. The information related to the cell set includes at least one piece of the following information: an identifier (ID) of a current serving cell, a physical cell identifier (PCI) of a neighboring cell adjacent to the serving cell, strength of a signal received by the user equipment 102 from the base station 101 through the serving cell, frequencies of the serving cell and the neighboring cell, a standard (for example, a 2G, 3G, 4G, or 5G standard formulated by the 3GPP or a future standard formulated by the 3GPP, for example, a 6G standard) of a modem (not shown in the figure) of the user equipment 102, and a status of the modem (not shown in the figure) (for example, an idle state (idle), a connected state (connected), an in-service state (in-service), a limited service state (limited service), an out-of-service state (out-of-service), and the like), and/or other information related to the cell set.

In step S222, the Wi-Fi module 213 may send Wi-Fi information to the cell controller 212, and the Wi-Fi information is related to a hotspot in a wireless local area network accessed by the user equipment 102. For example, the Wi-Fi information may include a MAC address of the hotspot, strength of a signal received by the user equipment 102 through the hotspot, and the like.

The cell controller 212 determines a location of the user equipment 102 based on the cell information from the cell measurement module 212 and the Wi-Fi information from the Wi-Fi module 213. For example, the cell controller 212 determines the location of the user equipment 102 based on the identifier (ID) of the serving cell in the cell information and/or the MAC address of the hotspot in the Wi-Fi information and the strength of the signal received through the hotspot. In addition, the cell controller 212 may determine, based on the strength of the signal received from the base station 101 through the serving cell in the cell information, whether the signal strength is too low (for example, lower than a signal strength threshold) and therefore affects communication quality. When the cell controller 212 determines that the strength of the signal received through the serving cell is too low, the user equipment 102 just enters the serving cell (for example, may be determined based on camp-on time), and/or another serving cell handover condition is satisfied, the cell controller 212 may determine a cell measurement policy that satisfies the cell measurement mode.

For example, to satisfy the cell measurement mode in which power consumption takes priority, the cell controller 212 may search, based on a current location of the user equipment 102 from a stored cell list, for cells on which the user equipment 102 once camped at the same location, and stability rankings of the cells. The stability ranking herein is determined based on a length of camp-on duration of the user equipment 102 in a cell on which the user equipment 102 once camped, a quantity of connection handovers with the cell (that is, determining whether a ping-pong handover exists), strength of a signal received through the cell, and the like. For example, the longer camp-on duration in a cell indicates the smaller quantity of connection handovers with the cell, and the stronger strength of the signal received through the cell indicates the more stable cell. If the cell list shows that the user equipment 102 once camped on N cells at the same location, the N cells are sequentially sorted based on stability of the N cells, for example, sorted in descending order of stability.

The cell controller 212 may obtain a neighboring cell combination (for example, the cells 111 to 116) of a current serving cell (for example, the cell 110) from the cell information from the cell measurement module 222. To save power consumption, the cell controller 212 or another module may select neighboring cells to be measured based on a plurality of criteria. For example, neighboring cells that are included in both the cell information and the cell list may be selected as the neighboring cells to be measured. For another example, a predetermined quantity of neighboring cells that are included in both the cell information and the cell list may be selected as the neighboring cells to be measured. For another example, several neighboring cells that are included in both the cell information and the cell list and that are sorted based on stability may be selected. The cell structure in FIG. 1 is used as an example. The neighboring cell combination (for example, the cells 111 to 116) of the current serving cell (for example, the cell 110) is obtained from the cell information from the cell measurement module 222. The cell list shows that the user equipment 102 once camped on the cells 111, 112, 113, 114, 115, and a cell 119 (not shown in the figure) at the same location, and the cells 113, 112, 114, 111, 115, and 119 are sequentially sorted in descending order of stability. All of the cells 111 to 115 are included in the cell information from the cell measurement module 222, and to save measurement power consumption, the cell controller 212 or the another module determines that a quantity of neighboring cells to be measured cannot exceed five cells. In this case, the cell controller 212 or the another module may determine that the neighboring cells to be measured are 113, 112, 114, 111, and 115.

In addition, the cell controller 212 may classify, based on a frequency priority list, the neighboring cells to be measured into a neighboring cell list belonging to a high priority and/or a neighboring cell list belonging to a low priority, and the frequency priority list lists priorities of frequencies corresponding to the neighboring cells to be measured. According to some embodiments of this application, a high-priority neighboring cell is usually a neighboring cell with high stability, that is, is usually a neighboring cell with long camp-on duration, few ping-pong handovers, and/or strong signal strength. On the contrary, a low-priority neighboring cell is usually a neighboring cell with poor stability, that is, is usually a neighboring cell with short camp-on duration, many ping-pong handovers, and/or weak signal strength. The foregoing frequency priority list lists the priorities of the frequencies. The priority may be determined according to a 3GPP standard followed by the modem, or may be obtained based on the stability rankings of the cells in the foregoing cell list that are obtained by the cell controller 212 or the another module through iterative learning of the communication quality of the user equipment 102. In addition, the priority of the frequency determined according to the 3GPP standard may be adjusted properly based on the stability rankings of the cells in the cell list. For example, for a cell with high stability in the cell list, if a frequency corresponding to the cell belongs to the low priority in the frequency priority list, the frequency may be adjusted to the high priority.

To save the power consumption, the cell controller 212 may determine that the cell measurement policy includes limiting a quantity of high-priority neighboring cells that need to be measured in each discontinuous reception (DRX) cycle in which the cell measurement is performed to a range of a high-priority cell threshold. That is, if the quantity of high-priority neighboring cells among the neighboring cells to be measured exceeds the high-priority cell threshold, high-priority neighboring cells whose quantity is the cell threshold are measured in each DRX cycle. For example, if there are three high-priority neighboring cells and two low-priority neighboring cells among the neighboring cells to be measured, and the high-priority cell threshold is set to 2. In this case, the cell measurement policy includes the two high-priority neighboring cells that can be measured in each DRX cycle. The cell controller 212 may select two high-priority neighboring cells with high stability from the cell list based on the cell list, and include the two high-priority neighboring cells in the cell measurement policy. On the contrary, if a quantity of high-priority neighboring cells among the neighboring cells to be measured is less than or equal to the high-priority cell threshold, high-priority neighboring cells whose quantity is the quantity of the high-priority neighboring cells are measured in each DRX cycle. For example, if there are one high-priority neighboring cell and four low-priority neighboring cells among the neighboring cells to be measured, and the high-priority cell threshold is set to 2, the cell measurement policy includes the one high-priority neighboring cell that can be measured in each DRX cycle.

To save the power consumption, the cell controller 212 may determine that the cell measurement policy includes: measuring at most one low-priority neighboring cell in each DRX cycle, and prolonging a time interval between every two adjacent measurements on the low-priority neighboring cell. According to some embodiments of this application, the cell measurement policy determines that the time interval is greater than or equal to one DRX cycle, for example, the time interval is obtained by subtracting one DRX cycle from a quantity of low-priority neighboring cells. In this case, it is unnecessary to measure the low-priority neighboring cell in some DRX cycles. For example, when the quantity of the low-priority neighboring cells is 2, the time interval between every two adjacent measurements on the low-priority neighboring cell may be 2−1=1 DRX cycle, that is, there is a difference of one DRX cycle between the every two adjacent measurements on the low-priority neighboring cell. In other words, according to the foregoing cell measurement policy, the low-priority neighboring cell is measured once every DRX cycle. In this way, measurement frequency of the low-priority neighboring cell can be reduced, to reduce power consumption required for the measurement. In addition, the cell measurement policy may alternatively determine that a time interval between two adjacent measurements on the low-priority neighboring cell may alternatively be different from a time interval between another two adjacent measurements on the low-priority neighboring cell. For example, when at most one low-priority neighboring cell is measured in each DRX cycle and the quantity of the low-priority neighboring cells is 2, an interval between measurements on the two low-priority neighboring cells for the first time is set to one DRX cycle, and an interval between measurements on the two low-priority neighboring cells for the second time is set to two DRX cycles, to further reduce the measurement on the low-priority neighboring cell, so as to further reduce the measurement power consumption.

Although the time interval between the two adjacent measurements on the low-priority neighboring cell is used as an example in the foregoing descriptions to describe a solution for reducing the measurement frequency of the low-priority neighboring cell, a person skilled in the art should understand that a similar technology may also be implemented in different embodiments. For example, the power consumption required for measuring the low-priority neighboring cell may be reduced by prolonging a measurement period of each low-priority neighboring cell. For example, if the time interval between the every two adjacent measurements on the low-priority neighboring cell is greater than or equal to one DRX cycle, it means that the measurement period of each low-priority neighboring cell is greater than L DRX cycles, where L is equal to the quantity of the low-priority neighboring cells. For example, when L is equal to 2, and the time interval between the every two adjacent measurements on the low-priority neighboring cell is set to one DRX cycle, the measurement cycle of each low-priority neighboring cell is 2*2=4 DRX cycles, that is, in every four DRX cycles, a same low-priority neighboring cell is measured once. It can be seen that this is only a difference in expression, but the principle is the same as above.

To save the power consumption, the cell controller 212 may determine that the cell measurement policy varies with different strength of signals received by the user equipment 102 through the serving cell. For example, the cell measurement policy may include a measurement start threshold and an escape threshold. If the strength of the received signal is higher than the measurement start threshold, that is, the communication quality of the serving cell is satisfactory at this time, the cell measurement policy determines not to measure the neighboring cell. On the contrary, if the strength of the received signal is lower than the escape threshold, that is, the communication quality of the serving cell is poor at this time, the cell measurement policy determines to measure the neighboring cell in a default mode, that is, the neighboring cell may be measured in a non-power-consumption-priority mode. For example, the cell measurement policy may specify that in such a case, all high-priority neighboring cells need to be measured in each DRX cycle, regardless of whether the quantity of the high-priority neighboring cells exceeds the high-priority cell threshold. For another example, in the default mode, the low-priority neighboring cell needs to be measured once in each DRX cycle. In this way, there is no time interval between two adjacent measurements on the low-priority neighboring cell, or the interval is 0. The reason for such a specification is that when the communication quality of the serving cell is very poor, the measurement on the neighboring cell needs to be strengthened to improve cell measurement performance, so as to improve the communication quality.

When the strength of the signal received by the user equipment 102 through the serving cell is between the measurement start threshold and a middle threshold, the cell measurement policy determines that a time interval between two adjacent measurements on the low-priority neighboring cell is T1. When the strength of the signal received by the user equipment 102 through the serving cell is between the middle threshold and the escape threshold, the cell measurement policy determines that the time interval between the two adjacent measurements on the low-priority neighboring cell is T2. The middle threshold is equal to a middle value between the measurement start threshold and the escape threshold, that is, an average value. In addition, because communication quality achieved when the signal strength is between the measurement start threshold and the middle threshold is better than communication quality achieved when the signal strength is between the middle threshold and the escape threshold, the cell measurement policy further specifies that T1 is greater than T2. In this way, when the communication quality is good (the signal strength is between the measurement start threshold and the middle threshold), the power consumption required for the cell measurement may be further reduced by prolonging the DRX cycle between the two adjacent measurements on the low-priority neighboring cell. On the contrary, when the communication quality is poor (the signal strength is between the middle threshold and the escape threshold), the cell measurement performance is further improved by shortening the DRX cycle between the two adjacent measurements on the low-priority neighboring cell.

According to some embodiments of this application, in step S223, the cell controller 212 pushes the cell measurement policy to the cell measurement module 222, so that the cell measurement module 222 measures the neighboring cell according to the cell measurement policy. In step S224, the cell measurement module 222 outputs a measurement result of the neighboring cell as a policy feedback to the cell controller 212, so that the cell controller 212 may determine, based on the policy feedback, whether to hand over the serving cell, and if determining to hand over the serving cell, determine a neighboring cell to which the serving cell is handed over. Usually, the measurement result may include signal strength (for example, RSRP), signal quality (for example, RSRQ), and/or another measurement result of each neighboring cell. In this case, the cell controller 212 may determine, by comparing the signal strength of the neighboring cell with the signal strength of the serving cell, whether and how to hand over the serving cell.

According to some embodiments of this application, when the cell measurement module 222 determines a location change (for example, a serving cell change) of the user equipment 102, or determine that the strength of the signal received by the user equipment 102 through the serving cell changes (for example, by comparing the signal strength with the signal strength between the measurement start threshold and the middle threshold and the signal strength between the middle threshold and the escape threshold), and the cell measurement policy from the cell controller 212 is not received after a predetermined period of time, to meet a requirement of saving power consumption, the cell measurement module 222 measures each high-priority neighboring cell in each DRX cycle, and sets the time interval between the two adjacent measurements on the low-priority neighboring cell to be greater than or equal to one DRX cycle. In addition, the cell measurement module 222 activates resetting of the cell controller 212 and determines the cell measurement policy by outputting policy exception information to the cell controller 212.

A person skilled in the art should understand that different embodiments may also implement the foregoing structures and/or functions of the user equipment 102. For example, some or all functions of the cell controller 212 may be combined with the AP subsystem 201, for example, combined with the functions of the AP 211, or combined with the cell measurement module 222 or another modem module in the modem subsystem 202. For another example, for the foregoing plurality of power consumption saving methods, for example, the quantity of the cells to be measured is reduced by using the cell list obtained by the cell controller 212 through iterative learning of cells on which the user equipment 102 camps at the same location previously, the quantity of the high-priority neighboring cells measured in each DRX cycle is reduced by setting the high-priority cell threshold, or the time interval between the two adjacent measurements on the low-priority neighboring cell is prolonged. The cell measurement policy may include one or more of the methods.

Figure 3A:
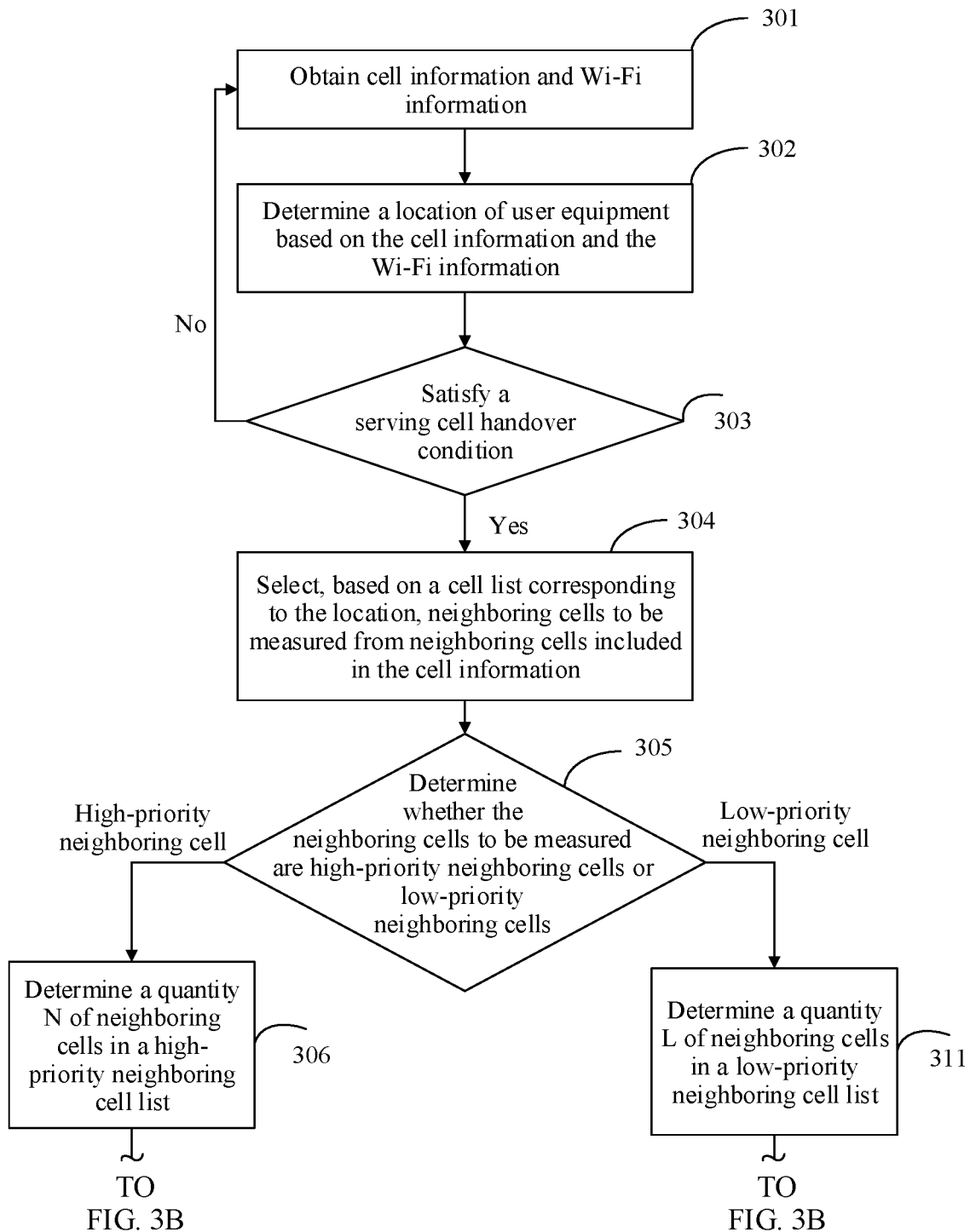
FIG. 3A and FIG. 3B are a flowchart of a first embodiment of a cell measurement and handover method according to some embodiments of this application.
Figure 3B:
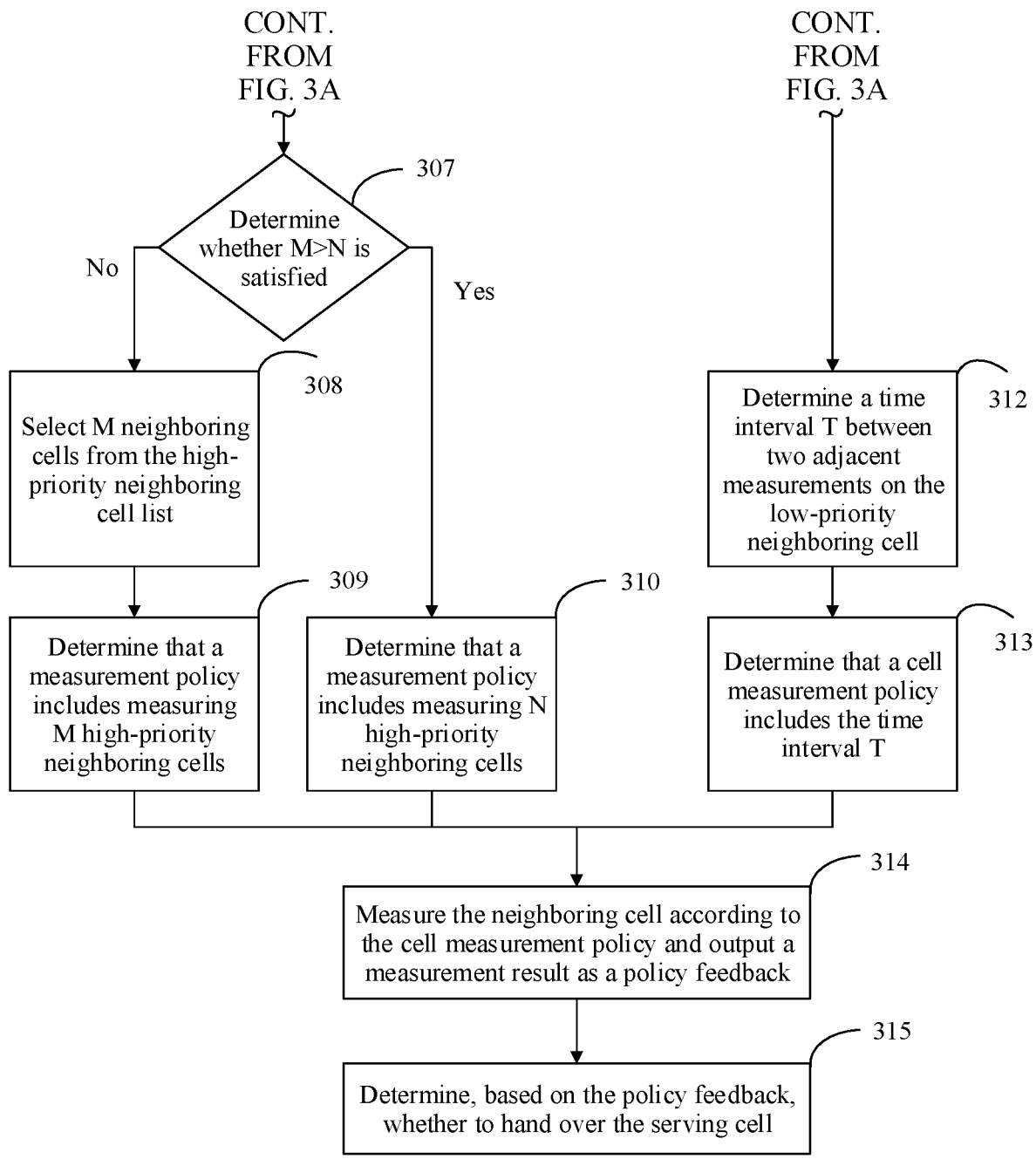

FIG. 3A and FIG. 3B are a flowchart of a first embodiment of a cell measurement and handover method according to some embodiments of this application. As shown in FIG. 3A and FIG. 3B, in block 301, the cell controller 212 or another module obtains cell information from the cell measurement module 222 and obtains Wi-Fi information from the Wi-Fi module 213. The cell information includes information of a cell set related to the user equipment 102, the cell set includes a serving cell (for example, the cell 110 in FIG. 1) at a location of the user equipment 102, and neighboring cells (for example, the neighboring cells 111 to 116 in FIG. 1) adjacent to the serving cell. The information related to the cell set includes but is not limited to an identifier (ID) of a current serving cell, a physical cell identifier (PCI) of a neighboring cell adjacent to the serving cell, strength of a signal received by the user equipment 102 from the base station 101 through the serving cell, frequencies of the serving cell and the neighboring cell, a standard (for example, a 2G, 3G, 4G, or 5G standard formulated by the 3GPP or a future standard formulated by the 3GPP, for example, a 6G standard) of a modem (not shown in the figure) of the user equipment 102, and a status of the modem (not shown in the figure) (for example, an idle state (idle), a connected state (connected), an in-service state (in-service), a limited service state (limited service), an out-of-service state (out-of-service), and the like), and/or other information related to the cell set. The Wi-Fi information is related to a hotspot in a wireless local area network accessed by the user equipment 102. For example, the Wi-Fi information may include but is not limited to a MAC address of the hotspot, strength of a signal received by the user equipment 102 through the hotspot, and the like.

In block 302, the cell controller 212 or the another module determines a location of the user equipment 102 based on the cell information and the Wi-Fi information. For example, the cell controller 212 or the another module may determine the location based on the serving cell in the cell information, or when it is difficult to accurately determine the location due to a large serving cell area, the cell controller 212 or the another module may determine the location of the user equipment 102 with reference to the serving cell and the MAC address of the hotspot in the Wi-Fi information.

Although in the foregoing descriptions, the cell controller 212 or the another module receives the cell information and the Wi-Fi information and determines the location of the user equipment 102 based on the cell information and the Wi-Fi information, a person skilled in the art should understand that the cell controller 212 or the another module may receive only the cell information and determine the location based on the cell information.

In block 303, the cell controller 212 or the another module determines whether a serving cell handover condition is satisfied. According to some embodiments of this application, the serving cell handover condition includes but is not limited to: Communication quality may be unstable because the user equipment 102 just enters a serving cell (for example, the cell 110 in FIG. 1), and the communication quality is affected because strength of a signal received by the user equipment 102 through the serving cell is excessively weak (for example, lower than a signal strength threshold), and/or another case that may result in a need to hand over the serving cell.

If it is determined that the serving cell handover condition is not satisfied, the cell controller 212 or the another module continues to obtain the cell information from the cell measurement module 222 and/or the Wi-Fi information from the Wi-Fi module. When it is determined that the serving cell handover condition is satisfied, in block 304, the cell controller 212 or the another module obtains a cell list corresponding to the location based on the location of the user equipment 102 determined in block 302, and selects neighboring cells that are included in the neighboring cells of the cell information from the cell measurement module 222 and that are simultaneously included in the cell list as neighboring cells to be measured. The cell list lists cells on which the user equipment 102 once camped at the same location and sorts stability of the cells. The stability ranking herein is determined based on a length of camp-on duration of the user equipment 102 in a cell on which the user equipment 102 once camped, a quantity of connection handovers with the cell (that is, determining whether a ping-pong handover exists), strength of a signal received through the cell, and/or another factor. For example, the longer camp-on duration in a cell indicates the smaller quantity of connection handovers with the cell, and the stronger strength of the signal received through the cell indicates the more stable cell. If the cell list shows that the user equipment 102 once camped on N cells at the same location, the N cells are sequentially sorted based on stability of the N cells, for example, sorted in descending order of stability.

The cell controller 212 or the another module may select the neighboring cells to be measured based on a plurality of criteria. For example, neighboring cells that are included in both the cell information and the cell list may be selected as the neighboring cells to be measured. For another example, a predetermined quantity of neighboring cells that are included in both the cell information and the cell list may be selected as the neighboring cells to be measured. For another example, several neighboring cells that are included in both the cell information and the cell list and that are sorted based on stability may be selected. The cell structure in FIG. 1 is used as an example. A neighboring cell combination (for example, the cells 111 to 116) of a current serving cell (for example, the cell 110) is obtained from the cell information from the cell measurement module 222. The cell list shows that the user equipment 102 once camped on the cells 111, 112, 113, 114, 115, and a cell 119 (not shown in the figure) at the same location, and the cells 113, 112, 114, 111, 115, and 119 are sequentially sorted in descending order of stability. All of the cells 111 to 114 are included in the cell information from the cell measurement module 222, and to save measurement power consumption, the cell controller 212 or the another module determines that a quantity of neighboring cells to be measured cannot exceed five cells. In this case, the cell controller 212 or the another module may determine that the neighboring cells to be measured are 113, 112, 114, 111, and 115.

In block 305, the cell controller 212 or the another module may determine whether the neighboring cells to be measured are high-priority neighboring cells or low-priority neighboring cells. According to some embodiments of this application, the cell controller 212 or the another module may classify, based on a frequency priority list, the neighboring cells to be measured into a neighboring cell list belonging to a high priority and/or a neighboring cell list belonging to a low priority, and the frequency priority list lists priorities of frequencies corresponding to the neighboring cells to be measured. According to some embodiments of this application, a high-priority neighboring cell is usually a neighboring cell with high stability, that is, is usually a neighboring cell with long camp-on duration, few ping-pong handovers, and/or strong signal strength. On the contrary, a low-priority neighboring cell is usually a neighboring cell with poor stability, that is, is usually a neighboring cell with short camp-on duration, many ping-pong handovers, and/or weak signal strength. The foregoing frequency priority list lists the priorities of the frequencies. The priority may be determined according to a 3GPP standard followed by the modem, or may be obtained based on the stability rankings of the cells in the foregoing cell list that are obtained by the cell controller 212 or the another module through iterative learning of the communication quality of the user equipment 102. In addition, the priority of the frequency determined according to the 3GPP standard may be adjusted properly based on the stability rankings of the cells in the cell list. For example, for a cell with high stability in the cell list, if a frequency corresponding to the cell belongs to the low priority in the frequency priority list, the frequency may be adjusted to the high priority.

When it is determined that the neighboring cells to be measured are high-priority neighboring cells, in block 306, the neighboring cells are added to the high-priority neighboring cell list, and a quantity N (N is an integer) of neighboring cells in the high-priority neighboring cell list is determined. In block 307, the cell controller 212 or the another module compares the quantity N of the neighboring cells with a high-priority cell threshold M (M is an integer). The high-priority cell threshold M may be an empirical value. When the high-priority cell threshold M is less than or equal to the quantity N of the high-priority neighboring cells in the high-priority neighboring cell list, in block 308, the cell controller 212 or the another module selects neighboring cells whose quantity is the high-priority cell threshold M. According to some embodiments of this application, the cell controller 212 or the another module may select M high-priority neighboring cells with high stability based on the stability rankings (for example, rankings in descending order of stability) of the cells in the cell list. In block 309, the cell controller 212 or the another module may determine that a cell measurement policy includes the M high-priority neighboring cells, and/or PCIs of the neighboring cells.

If it is determined in block 307 that the high-priority cell threshold M is greater than the quantity N of the high-priority neighboring cells in the high-priority neighboring cell list, in block 310, the cell controller 212 or the another module may determine that the cell measurement policy includes measuring N neighboring cells in the high-priority neighboring cell list, that is, all the neighboring cells in the high-priority neighboring cell list.

Return to block 305. If determining that the neighboring cells to be measured are low-priority neighboring cells, in block 311, the cell controller 212 or the another module adds the neighboring cells to the low-priority neighboring cell list, and determine a quantity L (L is an integer) of low-priority neighboring cells. In block 312, the cell controller 212 or the another module determines a time interval T between two adjacent measurements on the low-priority neighboring cell.

According to some embodiments of this application, the cell controller 212 or the another module determines that the time interval is greater than or equal to one DRX cycle, for example, L-1 DRX cycles. In this case, when L is greater than or equal to 2, it is unnecessary to measure the low-priority neighboring cell in some DRX cycles. For example, when L=2, the cell controller 212 or the another module may determine that a time interval between every two adjacent measurements on the low-priority neighboring cell is 2-1=1 DRX cycle, that is, there is a difference of one DRX cycle between the every two adjacent measurements on the low-priority neighboring cell. In other words, the low-priority neighboring cell is measured once every DRX cycle. In this way, measurement frequency of the low-priority neighboring cell can be reduced, to reduce power consumption required for the measurement.

Although the time interval between the every two adjacent measurements on the low-priority neighboring cell is determined as a same value (for example, L-1 DRX cycles), a person skilled in the art should understand that a similar technology may also be implemented in different embodiments. For example, a time interval between two adjacent measurements on the low-priority neighboring cell may alternatively be different from a time interval between another two adjacent measurements on the low-priority neighboring cell. For example, when at most one low-priority neighboring cell is measured in each DRX cycle and L is 2, an interval between measurements on the two low-priority neighboring cells for the first time is set to one DRX cycle, and an interval between measurements on the two low-priority neighboring cells for the second time is set to two DRX cycles, to further reduce the measurement on the low-priority neighboring cell, so as to further reduce the measurement power consumption.

Although the time interval between the two adjacent measurements on the low-priority neighboring cell is used as an example in the foregoing descriptions to describe a solution for reducing the measurement frequency of the low-priority neighboring cell, a person skilled in the art should understand that the solution may also be described by using another description means. For example, the power consumption required for measuring the low-priority neighboring cell may be reduced by prolonging a measurement period of each low-priority neighboring cell. For example, if the time interval between the every two adjacent measurements on the low-priority neighboring cell is greater than or equal to one DRX cycle, it means that the measurement period of each low-priority neighboring cell is greater than L DRX cycles, and L is equal to the quantity of the low-priority neighboring cells. For example, when L is equal to 2, and the time interval between the every two adjacent measurements on the low-priority neighboring cell is set to one DRX cycle, the measurement cycle of each low-priority neighboring cell is 2*2=4 DRX cycles, that is, in every four DRX cycles, a same low-priority neighboring cell is measured once. It can be seen that this is only a difference in expression, but the principle is the same as above.

In block 313, the cell controller 212 or the another module may determine that the cell measurement policy includes the time interval T (or the measurement period of each low-priority neighboring cell) between the two adjacent measurements on the low-priority neighboring cell determined in block 312.

In block 314, the cell measurement module 222 or another module measures the neighboring cell according to the cell measurement policy from the cell controller 212, and outputs a measurement result as a policy feedback to the cell controller 212 or the another module. According to some embodiments of this application, the cell measurement policy may include PCIs of high-priority neighboring cells to be measured (for example, the N high-priority neighboring cells or the M high-priority neighboring cells described above), PCIs of low-priority neighboring cell to be measured, and the time interval T between the every two measurements on the low-priority neighboring cell, or the measurement period of each low-priority neighboring cell.

For example, as shown in FIG. 1, the serving cell 110 in which the user equipment 102 is located has six neighboring cells 111 to 116. According to the foregoing cell list, the five neighboring cells to be measured are determined, which are respectively 113, 112, 114, 111, and 115 (sorted in descending order of stability). According to the foregoing frequency priority list, the cells 113, 112, and 114 are high-priority neighboring cells, and the cells 111 and 115 are low-priority neighboring cells. Because the high-priority cell threshold is set to 2, the cell measurement policy includes two high-priority neighboring cells and PCIs and/or frequencies of the high-priority neighboring cells, that is, PCIs and/or frequencies of the two cells 113 and 112 with high stability rankings in the cell list. Because the quantity of the low-priority neighboring cells is 2, that is, the cells 111 and 115, the cell measurement policy may include PCIs of the two low-priority neighboring cells, and the time interval T between the two adjacent measurements on the low-priority neighboring cell (for example, T-2-1=1 DRX cycle) or a measurement period C of each low-priority neighboring cell (for example, C=2*2=4 DRX cycles). When the time interval T between the every two adjacent measurements on the low-priority neighboring cell is different, an expression of T may be T_Nei1, T_Nei2, and so on. Nei1 represents a low-priority neighboring cell I, and Nei2 represents a low-priority neighboring cell 2. T_Nei1 represents a time interval between a measurement on the low-priority neighboring cell Nei1 and a measurement on the low-priority neighboring cell Nei2, and T_Nei2 represents a time interval between the measurement on the low-priority neighboring cell Nei2 and a next measurement on the low-priority neighboring cell Nei1. The rest may be deduced by analogy.

In block 315, the cell controller 212 or the another module determines, based on the policy feedback, whether to hand over the serving cell. For example, the cell controller 212 or the another module may compare strength of a signal received through a current serving cell with strength of a signal received through the neighboring cells, and if the signal strength of the neighboring cells is greater than the signal strength of the serving cell, the serving signal may be handed over to a neighboring cell with strongest signal strength. However, if the signal strength of the neighboring cells is less than the signal strength of the serving cell, it may be determined that the serving cell is not handed over.

Figure 4:
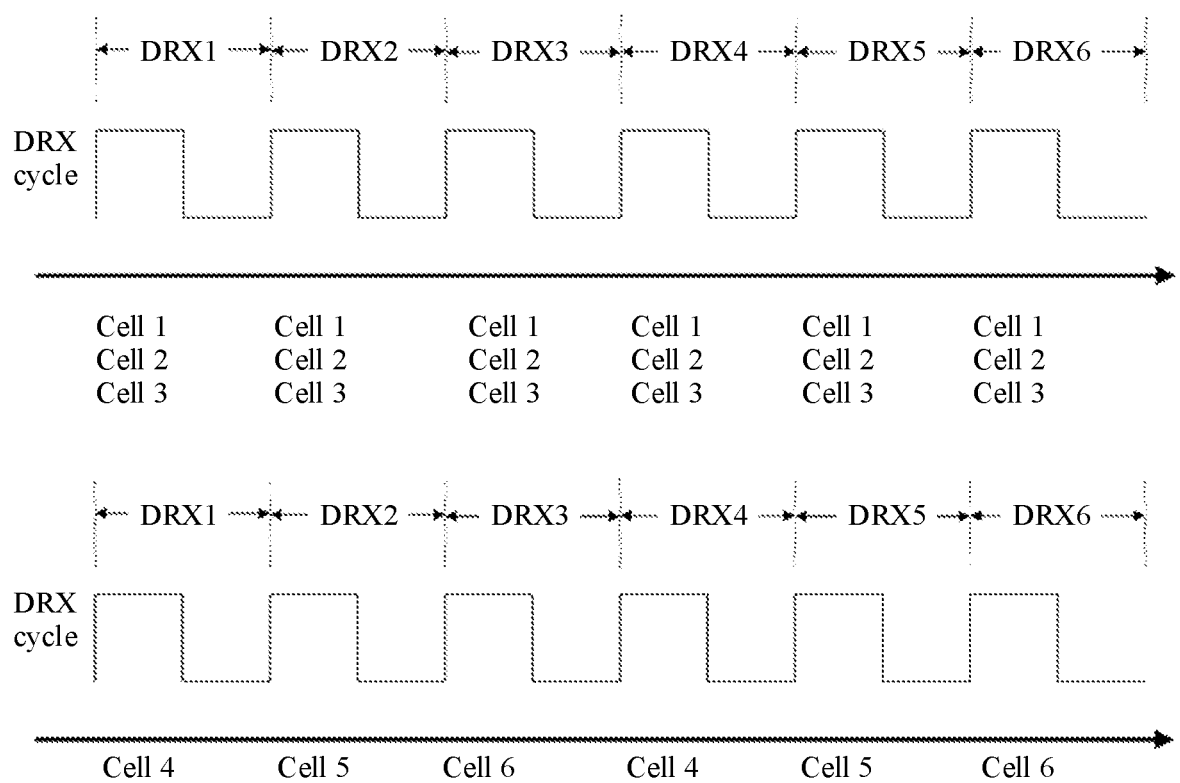
FIG. 4 is a time sequence diagram of a high-priority cell measurement and a low-priority cell measurement according to the conventional technology.
Figure 5:
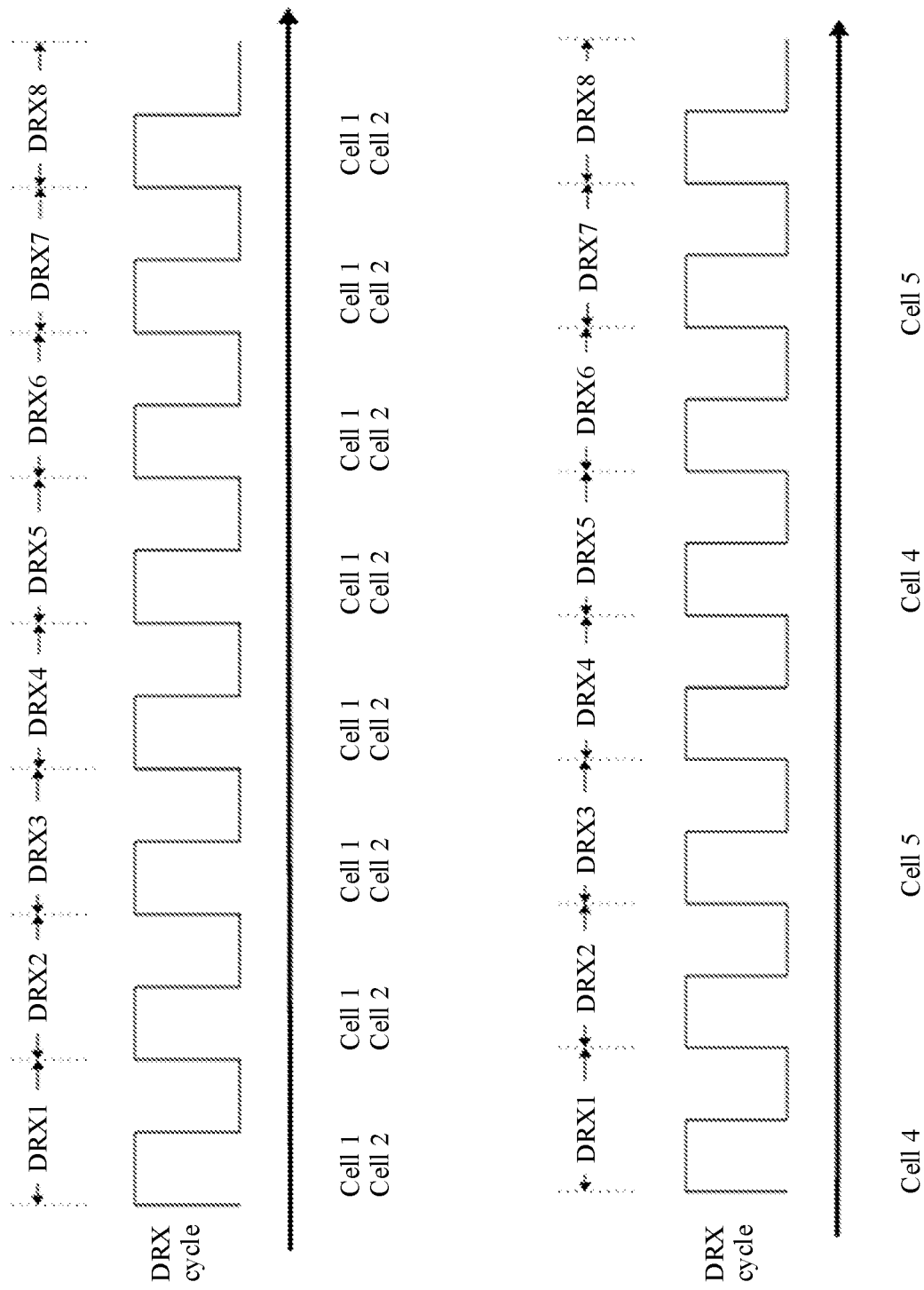
FIG. 5 is a time sequence diagram of a first embodiment of a high-priority cell measurement and a low-priority cell measurement according to some embodiments of this application.

The following describes advantages of the first embodiment of this application compared with the conventional technology with reference to FIG. 4 and FIG. 5. FIG. 4 is a time sequence diagram of a high-priority cell measurement and a low-priority cell measurement according to the conventional technology, and FIG. 5 is a time sequence diagram of a first embodiment of a high-priority cell measurement and a low-priority cell measurement according to some embodiments of this application.

As shown in FIG. 4, the user equipment 102 measures six neighboring cells, for example, the neighboring cells 111 to 116 in FIG. 1. To simplify the expression, the six neighboring cells are marked as cells 1 to 6. The cells 1 to 3 are high-priority neighboring cells, and the cells 4 to 6 are low-priority neighboring cells. Although FIG. 4 shows the six cells, a person skilled in the art should understand that, according to the conventional technology, the user equipment 102 may measure another quantity of neighboring cells. A same DRX cycle number in FIG. 4 or FIG. 5 represents a same DRX cycle.

As shown in FIG. 4, according to the conventional technology, in each measurement DRX cycle of a plurality of DRX cycles (for example, DRX cycles 1 to 6), each high-priority neighboring cell needs to be measured once. In addition, in each DRX cycle, a low priority needs to be measured. That is, if there are three low-priority neighboring cells, all of them need to be measured in three DRX cycles. In this way, according to the conventional technology, in each DRX cycle, a quantity of cells that need to be measured is 4, that is, the three high-priority neighboring cells 1 to 3 and one low-priority neighboring cell 4, 5, or 6. This may greatly increase power consumption occupied by the cell measurement.

On the contrary, according to the first embodiment of this application, the user equipment 102 first selects the neighboring cells to be measured from the six neighboring cells based on the foregoing cell list. The user equipment 102 may select, from the six neighboring cells, a predetermined quantity of neighboring cells sorted in descending order of stability in the cell list, for example, the neighboring cells 1 to 5. Then, the user equipment 102 divides the neighboring cells 1 to 5 into the high-priority neighboring cell list (for example, the cells 1 to 3) and the low-priority neighboring cell list (for example, the cells 4 and 5) according to the frequency priority list. The user equipment 102 compares a quantity (that is, 3) of neighboring cells in the high-priority neighboring cell list with the high-priority cell threshold (for example, 2). Because the quantity of neighboring cells in the high-priority neighboring cell list is greater than the high-priority cell threshold, the user equipment 102 selects, from the high-priority neighboring cell list, two neighboring cells sorted in descending order of stability in the cell list, for example, the neighboring cells 1 and 2. In addition, the user equipment 102 separately measures two high-priority neighboring cells, that is, the neighboring cells 1 and 2, in each DRX cycle of a plurality of DRX cycles. In addition, the user equipment 102 determines that a time interval between every two adjacent low-priority measurements is greater than or equal to one DRX cycle. For example, one DRX cycle subtracted from a quantity of neighboring cells (for example, two neighboring cells) in the low-priority neighboring cell list is the time interval, that is, 2−1=1 DRX cycle. In other words, in the plurality of DRX cycles, a low-priority neighboring cell is measured once every two DRX cycles.

According to the foregoing descriptions, as shown in FIG. 5, in each DRX cycle of a plurality of DRX cycles (that is, DRX cycles 1 to 8), two high-priority neighboring cells (that is, the cells 1 and 2) are measured, at most one low-priority neighboring cell is measured once in each DRX cycle, and a time interval between every two adjacent measurements on the low-priority neighboring cell is one DRX cycle, that is, the cell 4 is measured in DRX1, the cell is measured in DRX3, the cell 4 is measured in DRX5, and the cell 5 is measured in DRX7. That is, a measurement period of each low-priority neighboring cell is four DRX cycles, that is, a same low-priority neighboring cell is measured once in every 2*2-4 DRX cycles. As shown in FIG. 5, a measurement period of the cell 4 is four DRX cycles, that is, the cell 4 is measured once in every four DRX cycles (for example, the DRX1 to DRX4).

As shown in FIG. 5, in the DRX cycles 1, 3, 5, and 7, two high-priority neighboring cells are measured once, and one low-priority neighboring cell is measured once in each DRX cycle. In the DRX cycles 2, 4, 6, and 8, two high-priority neighboring cells are measured once in each DRX cycle, but the low-priority neighboring cell does not need to be measured. Compared with the conventional technology, that is, three high-priority neighboring cells and one low-priority neighboring cell need to be measured in each DRX cycle, the cell measurement policy in the first embodiment of this application greatly reduces a quantity of neighboring cells that need to be measured in each DRX cycle, so that power consumption required for the measurement is reduced.

Figure 6:
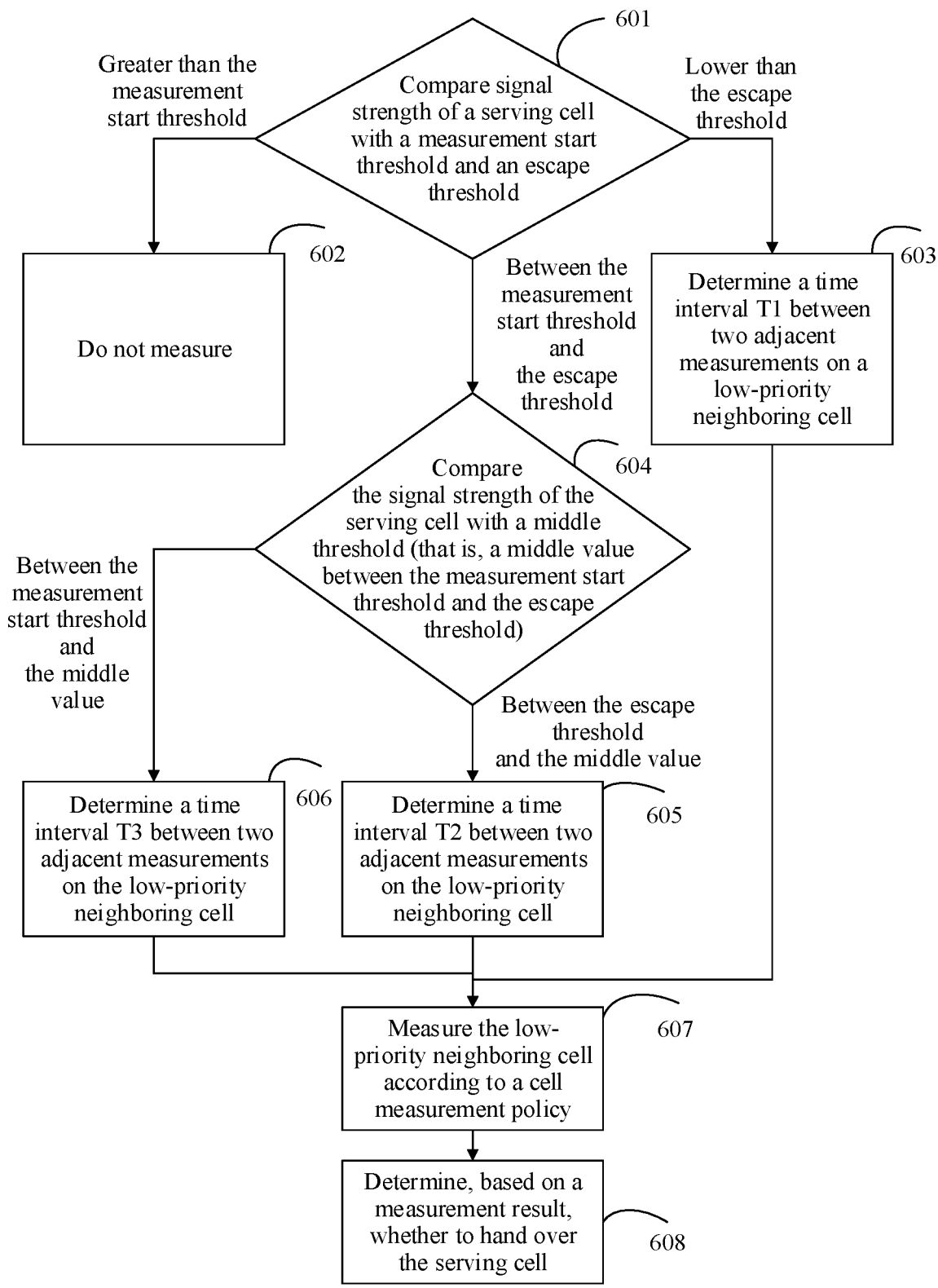
FIG. 6 is a flowchart of a second embodiment of a cell measurement and handover method according to some embodiments of this application.

FIG. 6 is a flowchart of a second embodiment of a cell measurement and handover method according to some embodiments of this application. As shown in FIG. 6, in block 601, the cell controller 212 or another module compares strength of a signal received by the user equipment 102 from the base station 101 through a current serving cell with a preset measurement start threshold and an escape threshold. The cell controller 212 or the another module may determine the signal strength based on cell information from the cell measurement module 222 or another module. According to some embodiments of this application, a method for setting the measurement start threshold and the escape threshold may include but is not limited to setting, as the measurement start threshold, a maximum value of signal strength measured during previous serving cell handovers, setting, as the escape threshold, a minimum value of the signal strength measured during previous serving cell handovers; or setting, as the measurement start threshold, an average value of the signal strength measured during previous serving cell handovers plus an offset value, and setting, as the escape threshold, the average value of the signal strength measured during previous serving cell handovers minus an offset value; and/or another setting method.

If it is determined in the comparison of block 601 that the strength of the signal received through the serving cell is greater than the measurement start threshold, in block 602, the cell controller 212 or the another module determines not to measure a neighboring cell. This is because when the strength of the signal received through the serving cell is higher than the measurement start threshold, communication quality of the serving cell is satisfactory. Therefore, it may be determined that the neighboring cell is not measured to reduce power consumption. If it is determined in the comparison of block 601 that the strength of the signal received through the serving cell is lower than the measurement start threshold, in block 603, the cell controller 212 or the another module may determine that a time interval T1 between two adjacent measurements on a low-priority neighboring cell is a default value. According to some embodiments of this application, the default value may be a solution in the conventional technology, that is, T1-0. In other words, there is no time interval between two adjacent measurements on the low-priority neighboring cell, that is, a low priority needs to be measured in each DRX cycle. As shown in FIG. 4, the low-priority cell 4 needs to be measured in DRX1, the low-priority cell 5 needs to be measured in DRX2, and the low-priority cell 6 needs to be measured in DRX3. This is because when the strength of the signal received through the serving cell is lower than the escape threshold, the communication quality of the serving cell may be poor. Therefore, measurement frequency of the low-priority neighboring cell may be increased by shortening or canceling a time interval between two adjacent measurements on the low-priority neighboring cell, to strengthen the measurement on the neighboring cell, so as to improve cell measurement performance.

If it is determined in the comparison of block 601 that the strength of the signal received through the serving cell is between the measurement start threshold and the escape threshold, in block 604, the signal strength is compared with a middle value (that is, (Measurement start threshold+ Escape threshold)/2) of the measurement start threshold and the escape threshold. The middle value of the measurement start threshold and the escape threshold is referred to as a middle threshold. When the signal strength is between the middle threshold and the escape threshold, in block 605, the cell controller 212 or the another module determines that a time interval between two adjacent measurements on the low-priority neighboring cell is T2. When the signal strength is between the measurement start threshold and the middle threshold, in block 606, the cell controller 212 or the another module determines that a time interval between two adjacent measurements on the low-priority neighboring cell is T3. A relationship between T1, T2, and T3 may be T3>T2>T1. This is because communication quality achieved when the signal strength is between the measurement start threshold and the middle threshold is better than communication quality achieved when the signal strength is between the middle threshold and the escape threshold, it may be determined that T3 is greater than T2. In this way, when the communication quality is good (that is, the signal strength is between the measurement start threshold and the middle threshold), power consumption required for a cell measurement may be further reduced by prolonging a time interval between two adjacent measurements on the low-priority neighboring cell. On the contrary, when the communication quality is poor (that is, the signal strength is between the middle threshold and the escape threshold), the cell measurement performance is further improved by shortening a time interval between two adjacent measurements on the low-priority neighboring cell. According to this principle, because the communication quality is the worst when the signal strength is lower than the escape threshold, the corresponding time interval T1 is also the smallest.

In block 607, the cell measurement module 222 or another module measures the low-priority neighboring cell according to a cell measurement policy including the time interval T pushed by the cell controller 212 or the another module. For example, the low-priority neighboring cell is measured based on the time interval T1, T2, or T3.

In block 608, the cell controller 212 or the another module determines, based on a measurement result in a policy feedback from the cell measurement module 222 or the another module, whether there is a need to hand over the serving cell.

Although the flowchart in FIG. 6 shows that the user equipment 102 determines, based on different strength of signals received from the base station 101 through the serving cell, that different time intervals between two adjacent measurements on the low-priority neighboring cell are different, a person skilled in the art should understand that the user equipment 102 may further determine different high-priority neighboring cell measurement policies based on the cell strength. For example, when the strength of the signal received through the serving cell is lower than the escape threshold, all high-priority neighboring cells are measured in each DRX cycle. When the signal strength is between the measurement start threshold and the escape threshold, a quantity of high-priority neighboring cells measured in each DRX cycle cannot exceed the high-priority cell threshold. When the signal strength is higher than the measurement start threshold, the high-priority neighboring cell is not measured. Therefore, power consumption caused by measurement of the high-priority neighboring cell is reduced. In addition, the cell measurement method shown in FIG. 6 may be combined with the foregoing other cell measurement methods. For example, a preset quantity of neighboring cells sorted in descending order of stability in the cell list may be selected from neighboring cells of the serving cell as neighboring cells to be measured, and the neighboring cells to be measured are classified into high-priority neighboring cells and low-priority neighboring cells based on a frequency priority list. In this way, the power consumption required for the cell measurement can be further reduced.

Figure 7:
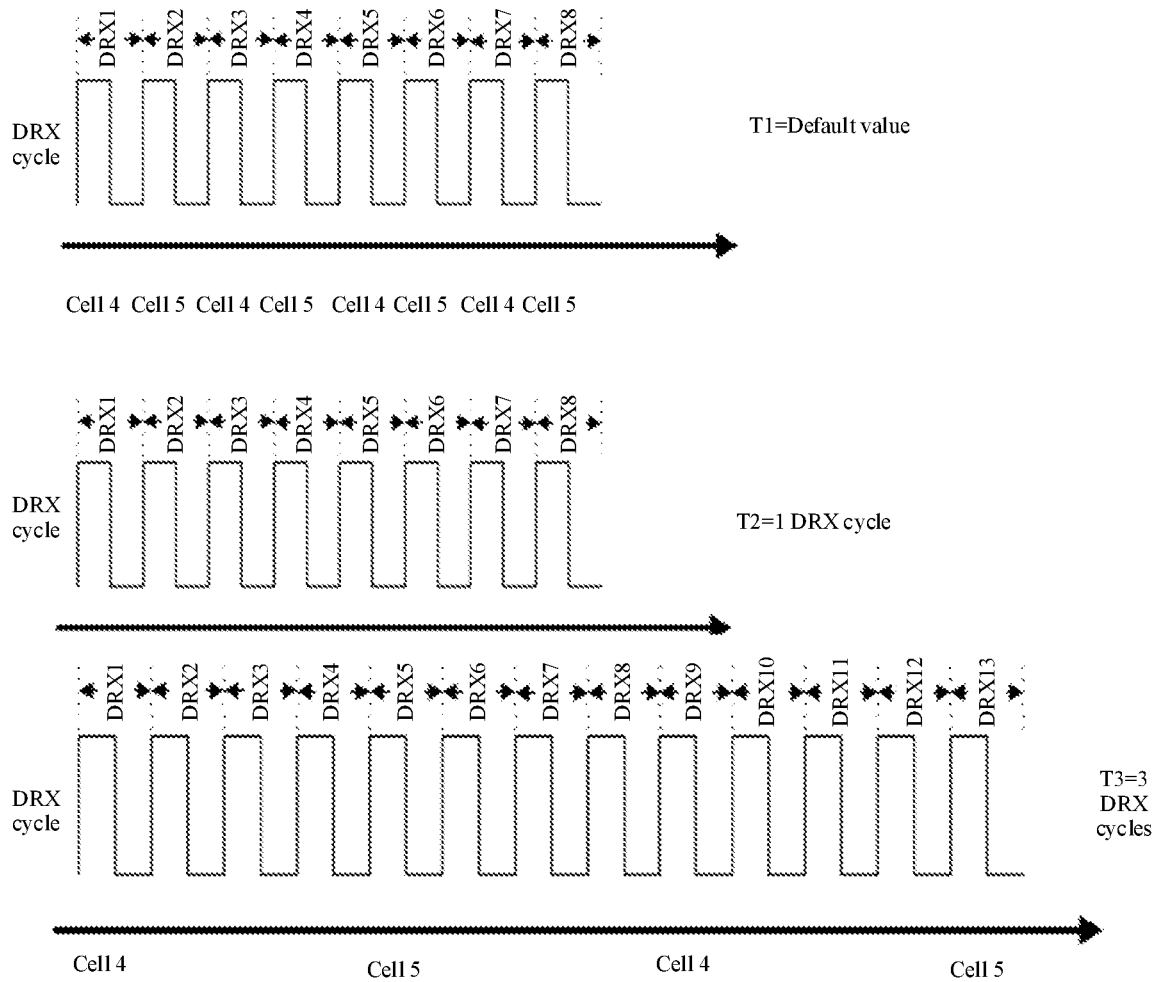
FIG. 7 is a time sequence diagram of a second embodiment of a low-priority cell measurement according to some embodiments of this application.

FIG. 7 is a time sequence diagram of a second embodiment of a low-priority cell measurement according to some embodiments of this application, and it is assumed that low-priority neighboring cells include the cell 4 and the cell 5. A same DRX cycle number in FIG. 7 represents a same DRX cycle.

A first time sequence diagram shown in FIG. 7 corresponds to the time interval T1 determined in block 603 of FIG. 6, that is, corresponds to the time interval between the two adjacent measurements on the low-priority neighboring cell (for example,) determined when the strength of the signal received through the serving cell is lower than the escape threshold. A second time sequence diagram shown in FIG. 7 corresponds to the time interval T2 determined in block 605 of FIG. 6, that is, corresponds to the time interval between the two adjacent measurements on the low-priority neighboring cell determined when the strength of the signal received through the serving cell is between the middle threshold and the escape threshold. A third time sequence diagram shown in FIG. 7 corresponds to the time interval T3 determined in block 606 of FIG. 6, that is, corresponds to the time interval between the two adjacent measurements on the low-priority neighboring cell determined when the strength of the signal received through the serving cell is between the measurement start threshold and the middle threshold.

In the first time sequence diagram shown in FIG. 7, T1 is a default value. According to this embodiment of this application, the default value is equal to 0, that is, there is no time interval between two adjacent measurements on the low-priority neighboring cell. In other words, in the first time sequence diagram of FIG. 7, the cell 4 is measured for the first time in a DRX1 cycle, the cell 5 is measured for the first time in a DRX2 cycle, the cell 4 is measured for the second time in a DRX3 cycle, the cell 5 is measured for the second time in a DRX4 cycle, and so on. It can be seen that there is no time interval between measuring the cell 4 and the cell 5 for the first time.

In the second time sequence diagram shown in FIG. 7, T2 is one DRX cycle, that is, an interval between two adjacent measurements on the low-priority neighboring cell is one DRX cycle (or a quantity of low-priority neighboring cells (L=2) minus 1=1 DRX cycle). In other words, in the second time sequence diagram of FIG. 7, the cell 4 is measured for the first time in the DRX1 cycle, the cell 5 is measured for the first time in the DRX3 cycle, the cell 4 is measured for the second time in a DRX5 cycle, the cell 5 is measured for the second time in a DRX7 cycle, and so on. It can be seen that there is one time interval between measuring the cell 4 and the cell 5 for the first time, and there is also one time interval between measuring the cell 4 and the cell 5 for the second time.

In the third time sequence diagram shown in FIG. 7, T3 is three DRX cycles, that is, an interval between two adjacent measurements on the low-priority neighboring cell is one DRX cycle (or a quantity$^2$ of low-priority neighboring cells ($L^2=2^2$) minus 1=3 DRX cycles). In other words, in the third time sequence diagram of FIG. 7, the cell 4 is measured for the first time in the DRX1 cycle, the cell 5 is measured for the first time in the DRX5 cycle, the cell 4 is measured for the second time in a DRX9 cycle, the cell 5 is measured for the second time in a DRX13 cycle, and so on. It can be seen that there are three time intervals between measuring the cell 4 and the cell 5 for the first time, and there is also three time intervals between measuring the cell 4 and the cell 5 for the second time.

As shown in FIG. 7, T3>T2>T1. This is because communication quality when the signal strength is between the measurement start threshold and the middle threshold is better than communication quality when the signal strength is between the middle threshold and the escape threshold, it may be determined that T3 is greater than T2. In this way, when the communication quality is good (that is, the signal strength is between the measurement start threshold and the middle threshold), power consumption required for a cell measurement may be further reduced by prolonging a time interval between two adjacent measurements on the low-priority neighboring cell. On the contrary, when the communication quality is poor (that is, the signal strength is between the middle threshold and the escape threshold), cell measurement performance is further improved by shortening a time interval between two adjacent measurements on the low-priority neighboring cell. According to this principle, because the communication quality is the worst when the signal strength is lower than the escape threshold, the corresponding time interval T1 is also the smallest.

Although FIG. 7 shows that a difference in the strength of the signal received through the serving cell results in a difference in the time interval between the two adjacent measurements on the low-priority neighboring cell, a person skilled in the art should understand that a similar technology may be implemented in different embodiments. For example, when the relationship of T1<T2<T3 remains unchanged, specific values of T1, T2, and/or T3 may be different from those described above. For another example, a time interval between two adjacent measurements on the low-priority neighboring cell may be different from a time interval between another two adjacent measurements on the low-priority neighboring cell. In addition, T1, T2, and/or T3 may represent a measurement period of each low-priority neighboring cell. For example, T1 represents a measurement period of a low-priority neighboring cell (for example, the cell 4) when the signal strength is lower than the escape threshold. For example, T1=2 DRX cycles, that is, the cell 4 is measured once in two DRX cycles. By analogy, T2 represents a measurement period of a low-priority neighboring cell (for example, the cell 4) when the signal strength is between the middle threshold and the escape threshold. For example, T2=4 DRX cycles, that is, the cell 4 is measured once in 4 DRX cycles. T3 represents a measurement period of a low-priority neighboring cell (for example, the cell 4) when the signal strength is between the measurement start threshold and the middle threshold. For example, T3=8 DRX cycles, that is, the cell 4 is measured once in 8 DRX cycles.

Figure 8A:
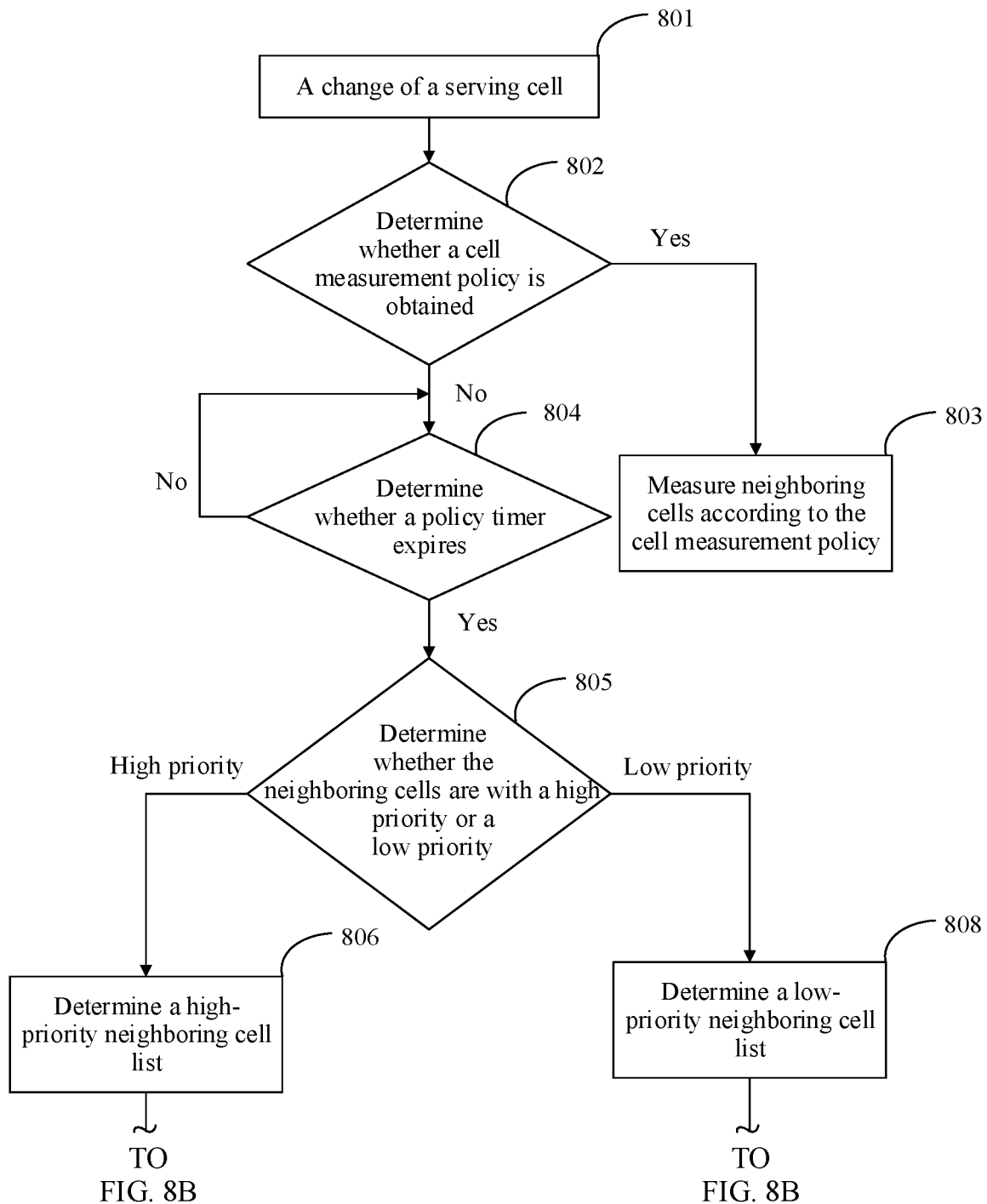
FIG. 8A and FIG. 8B are a flowchart of a third embodiment of a cell measurement and handover method according to some embodiments of this application.
Figure 8B:
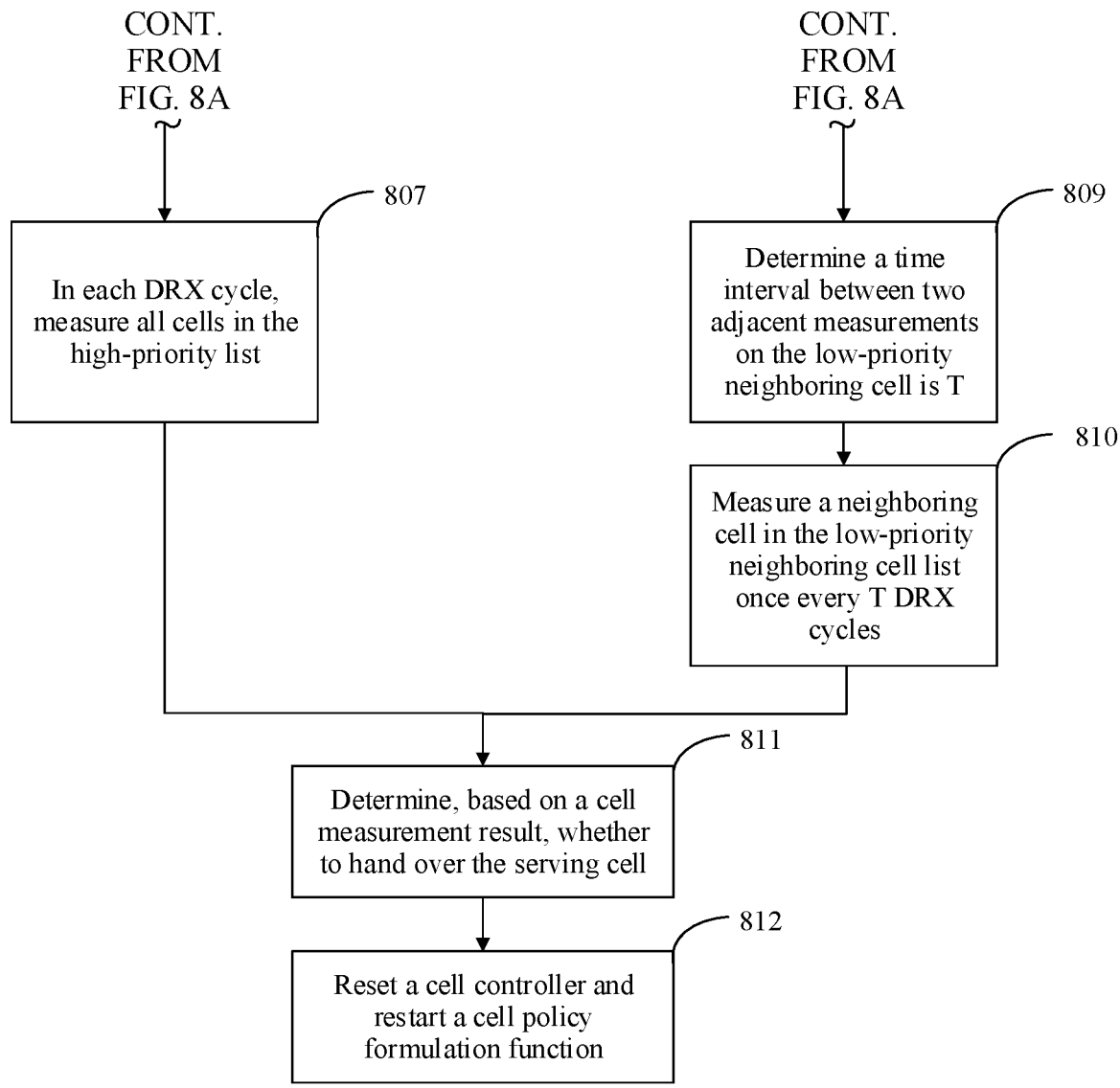

FIG. 8A and FIG. 8B are a flowchart of a third embodiment of a cell measurement and handover method according to some embodiments of this application. As shown in FIG. 8A and FIG. 8B, in block 801, the cell measurement module 222 or another module detects that a serving cell in which the user equipment 102 is located changes. Usually, a change of a location of the user equipment 102 may cause the change of the serving cell. For example, the user equipment 102 just enters the serving cell, or hands over from one serving cell to another serving cell. In block 802, the cell measurement module 222 or the another module determines whether to obtain a cell measurement policy corresponding to the serving cell pushed by the cell controller 212 or another module. If the cell measurement policy is obtained, in block 803, the cell measurement module 222 or the another module measures a cell according to the cell measurement policy.

If the cell measurement policy is not obtained, in block 804, the cell measurement module 222 or the another module starts a policy timer, and determines whether the policy timer expires. If the policy timer does not expire, the cell measurement module 222 or the another module repeats the operations in the operation blocks 802 and 804, that is, continuously determining, during running of the policy timer, whether the cell measurement policy pushed by the cell controller 212 or the another module is received. When the policy timer expires and the cell measurement policy pushed by the cell controller 212 or the another module is not received, in block 805, the cell measurement module 222 or the another module determines, based on the frequency priority list, whether neighboring cells of the serving cell are high-priority neighboring cells or low-priority neighboring cells. If the neighboring cells are the high-priority neighboring cells, in block 806, the cell measurement module 222 or the another module adds the neighboring cells to a high-priority neighboring cell list. If the neighboring cells are the low-priority neighboring cells, in block 809, the cell measurement module 222 or the another module adds the neighboring cells to a low-priority neighboring cell list.

After the high-priority neighboring cell list is determined in block 807, in block 808, the cell measurement module 222 or the another module measures all high-priority neighboring cells in the high-priority neighboring cell list once in each DRX cycle of a plurality of DRX cycles.

After the low-priority neighboring cell list is determined in block 808, in block 810, the cell measurement module 222 or the another module determines that a time interval between two adjacent measurements on the low-priority neighboring cell is T. According to some embodiments of this application, when a cell measurement mode is set to a power consumption priority mode, the interval T is greater than or equal to one DRX cycle, for example, one DRX cycle subtracted from a quantity (L) of neighboring cells in the low-priority neighboring cell list is the interval T. In addition, in block 811, the cell measurement module 222 or the another module measures a neighboring cell in the low-priority neighboring cell list once every T DRX cycles.

The cell measurement module 222 or the another module fails to receive the cell measurement policy pushed by the cell controller 212 or the another module within preset time (for example, within running time of the policy timer). Therefore, the cell measurement module 222 or the another module feeds back a cell measurement result and information indicating a policy exception to the cell controller 212 or the another module. In block 812, the cell controller 222 or the another module determines whether to hand over a current serving cell based on the cell measurement result from the cell measurement module 222 or the another module. In block 813, in response to the information indicating the policy exception, the cell controller 222 or the another module are reset to start a cell policy formulation function.

A person skilled in the art should understand that a technical solution similar to that in FIG. 8A and FIG. 8B may also be implemented in another embodiment. For example, in block 801, the cell measurement module 222 or the another module may determine a case other than the change of the serving cell, for example, strength of a signal received by the user equipment 102 through the serving cell is too low (for example, below a threshold). For another example, if the cell measurement module 222 or the another module fails to receive the cell measurement from the cell controller 212 or the another module within a running period of the policy timer, the cell measurement module 222 or the another module may first select, from the neighboring cells of the serving cell, a predetermined quantity of neighboring cells sorted in descending order of stability in the cell list, and perform priority classification and a measurement on the neighboring cells instead of measuring all neighboring cells of the serving cell. For another example, the cell measurement module 222 or the another module may determine that a quantity of high-priority neighboring cells measured in each DRX cycle cannot exceed the high-priority cell threshold. For another example, the cell measurement module 222 or the another module may also determine that a time interval between two adjacent measurements on the low-priority neighboring cell is different from a time interval between another two adjacent measurements on the low-priority neighboring cell, and the like.

Figure 9:
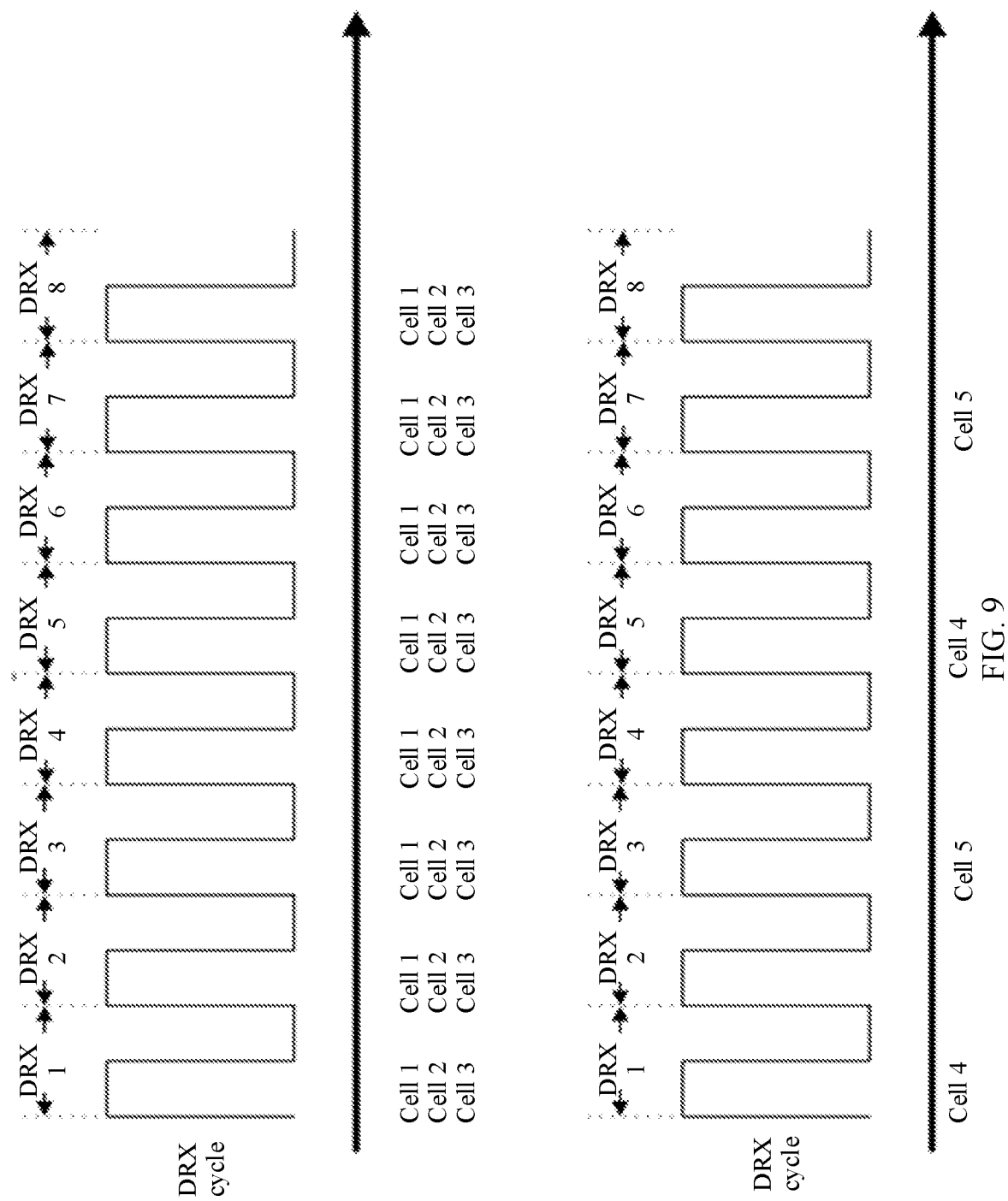
FIG. 9 is a time sequence diagram of a third embodiment of a high-priority cell measurement and a low-priority cell measurement according to some embodiments of this application.

FIG. 9 is a time sequence diagram of a third embodiment of a high-priority cell measurement and a low-priority cell measurement according to some embodiments of this application.

According to the first embodiment of this application, the cell measurement module 222 or another module first selects, from the neighboring cells (for example, the neighboring cells 1 to 6) of the serving cell, several neighboring cells that are located in the cell list and that are sorted in descending order of cell stability, for example, the neighboring cells 1 to 5 are selected as the neighboring cells to be measured. Then, the cell measurement module 222 or the another module divides the neighboring cells 1 to 5 into the high-priority neighboring cell list (for example, the cells 1 to 3) and the low-priority neighboring cell list (for example, the cells 4 and 5) according to the frequency priority list. Because the cell measurement module 222 or the another module fails to receive, within the running period of the policy timer, the cell measurement policy pushed by the cell controller 212 or the another module, the cell measurement module 222 or the another module measures all high-priority neighboring cells (that is, the neighboring cells 1 to 3) in each DRX cycle of the plurality of DRX cycles. In addition, a low-priority neighboring cell is measured once every two DRX cycles of the plurality of DRX cycles. In this way, because a time interval between two adjacent measurements on the low-priority neighboring cell is greater than or equal to one DRX cycle, the low-priority neighboring cell does not need to be measured in some DRX cycles, to reduce power consumption required for the cell measurement.

Figure 10:
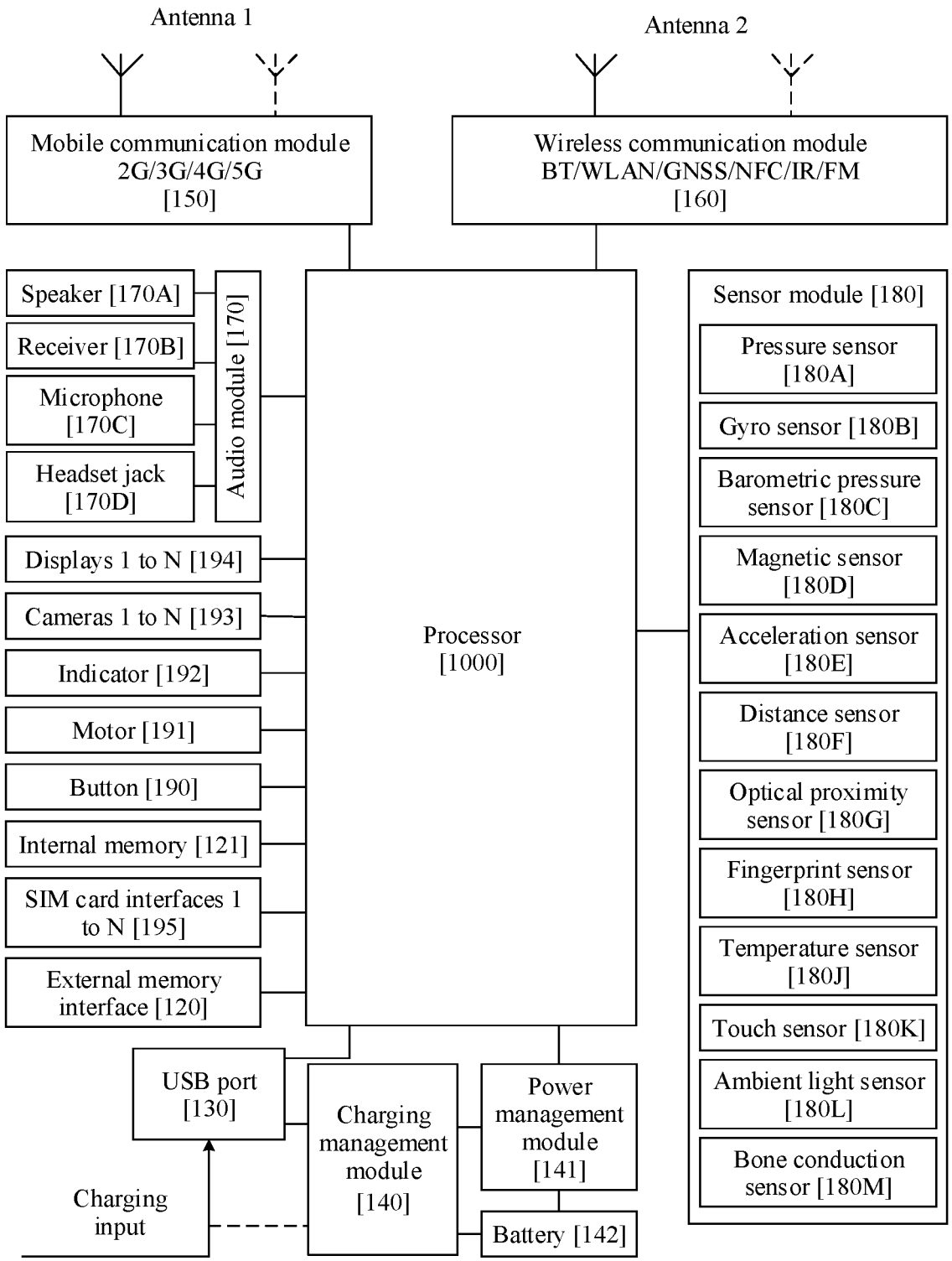
FIG. 10 is a schematic diagram of a system of user equipment according to some embodiments of this application.
Figure 11:
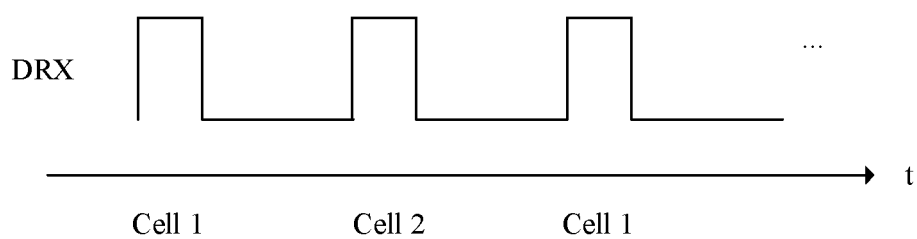
FIG. 11 and FIG. 12 respectively show measurement time sequence diagrams for measuring two recommended low-priority cells and one recommended low-priority cell when the low-priority cell is recommended according to the conventional technology.
Figure 12:
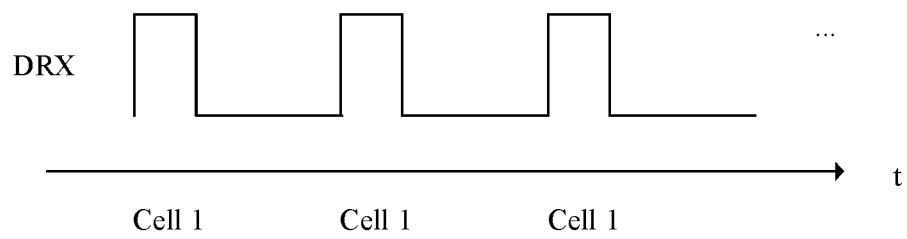

FIG. 10 is a schematic diagram of a structure of user equipment 102 according to an embodiment of this application.

The user equipment 102 may include a processor 1000, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the user equipment 500. In some other embodiments of this application, the user equipment 500 may include more or fewer components than those shown in the figure, or combine some components, or split some components, or have different component arrangements. The components shown in the figure may be implemented by hardware, software, or a combination of software and hardware.

The processor 1000 may include one or more processing units. For example, the processor 1000 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The processor may generate an operation control signal based on an instruction operation code and a time sequence signal to complete control of instruction fetching and instruction execution.

A memory may be further disposed in the processor 1000, and is configured to store instructions and data. In some embodiments, the memory in the processor 1000 is a cache. The memory may store instructions or data that has been used or cyclically used by the processor 1000. If the processor 1000 needs to use the instructions or the data again, the processor may directly invoke the instructions or the data from the memory. This avoids repeated access, reduces waiting time of the processor 1000, and improves system efficiency.

In some embodiments, the processor 1000 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, or a subscriber identification module (subscriber identification module, SIM) interface.

A wireless communication function of the user equipment 500 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the user equipment 500 may be configured to cover one or more communication frequency bands. Different antennas may be further multiplexed, to improve antenna utilization. For example, the antenna 1 may be multiplexed as a diversity antenna of a wireless local area network. In some other embodiments, the antennas may be used in combination with a tuning switch.

The mobile communication module 150 may provide a wireless communication solution that includes 2G/3G/4G/5G or the like and that is applied to the user equipment 500. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave by using the antenna 1 for radiation. In some embodiments, at least some functional modules of the mobile communication module 150 may be disposed in the processor 1000. In some embodiments, at least some functional modules of the mobile communication module 150 may be disposed in a same device as at least some modules of the processor 1000. As shown in FIG. 5, the NAS layer, the RRC layer, and the PHY layer according to embodiments of this application may be disposed in the mobile communication module 150 as functional modules.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 1000, and is disposed in a same device as the mobile communication module 150 or another functional module.

In some embodiments, in the user equipment 500, the antenna 1 and the mobile communication module 150 are coupled, and the antenna 2 and the wireless communication module 160 are coupled, so that the user equipment 500 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like.

The external memory interface 120 may be used to connect to an external storage card, for example, a Micro SD card, to extend a storage capability of the user equipment 500. The external storage card communicates with the processor 1000 through the external memory interface 120, to implement a data storage function. For example, files such as music and a video are stored in the external storage card. In this embodiment of this application, a cell search parameter table may be stored in an external memory card connected by using the external memory interface 120.

The internal memory 121 may be configured to store computer-executable program code. The executable program code includes instructions. The internal memory 121 may include a program storage area and a data storage area. The program storage area may store an operating system, an application required by at least one function (for example, a voice play function and an image play function), and the like. The data storage area may store data (for example, audio data and an address book) and the like created during use of the user equipment 500. In addition, the internal memory 121 may include a high-speed random access memory, and may further include a nonvolatile memory, for example, at least one magnetic disk storage device, a flash storage device, a universal flash storage (universal flash storage, UFS), and the like. The processor 1000 runs the instructions stored in the internal memory 121, and/or the instructions stored in the memory disposed in the processor, to perform various function applications of the user equipment 500 and data processing. In this embodiment of this application, the internal memory 121 may be configured to store the cell search parameter table, and the processor 1000 may be configured to perform the cell search method shown in FIG. 3A and FIG. 3B and FIG. 4.

The SIM card interface 195 is configured to connect to a SIM card. The SIM card may be inserted into the SIM card interface 195 or removed from the SIM card interface 195, to implement contact with or separation from the user equipment 500. The user equipment 500 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 may be compatible with different types of SIM cards. The SIM card interface 195 may also be compatible with an external storage card. The user equipment 500 interacts with a network through the SIM card, to implement functions such as calling and data communication. In some embodiments, the user equipment 500 uses an eSIM, that is, an embedded SIM card. The eSIM card may be embedded in the user equipment 500, and cannot be separated from the user equipment 500. In this embodiment of this application, information of a wireless communication network such as a PLMN may be stored in an SIM card.

All method implementations of this application may be implemented by software, a magnetic component, firmware, or the like.

Program code may be used to input instructions, to perform functions described in this specification and generate output information. The output information may be applied to one or more output devices in a known manner. For a purpose of this application, a processing system includes any system having a processor such as a digital signal processor (DSP), a microcontroller, an application-specific integrated circuit (ASIC), or a microprocessor.

The program code may be implemented in a high-level procedural language or an object-oriented programming language, to communicate with the processing system. The program code may alternatively be implemented by using an assembly language or a machine language when needed. Actually, the mechanism described in this specification is not limited to a scope of any particular programming language. In any case, the language may be a compiled language or an interpretive language.

One or more aspects of at least one embodiment may be implemented by using representative instructions stored on a computer-readable storage medium. The instructions represent various logic in a processor, and when the instructions are read by a machine, the machine acts on the logic for performing the technologies described in this specification. These representations referred to as "IP cores" may be stored in a tangible computer-readable storage medium and provided for a plurality of customers or production facilities for loading into a manufacturing machine that actually manufactures the logic or the processor.

Although this application is described with reference to a preferred embodiment, it does not mean that a characteristic of this application is limited only to this implementation. On the contrary, a purpose of describing the present invention with reference to the implementations is to cover other selections or modifications that may be derived based on the claims of this application. To provide an in-depth understanding of this application, the following descriptions include a plurality of specific details. This application may be alternatively implemented without using these details. In addition, to avoid confusion or blurring a focus of this application, some specific details are omitted from the description. It should be noted that embodiments in this application and the features in embodiments may be mutually combined in the case of no conflict.

Furthermore, various operations will be described as a plurality of discrete operations in a manner that is most conducive to understanding illustrative embodiments. However, a described order should not be construed as implying that these operations need to depend on the order. In particular, these operations do not need to be performed in the rendered order.

As used herein, a term "module" or "unit" may mean, be, or include: an application-specific integrated circuit (ASIC), an electronic circuit, a (shared, dedicated, or group) processor and/or a memory that executes one or more software or firmware programs, a composite logic circuit, and/or another proper component that provides the described functions.

In the accompanying drawings, some structure or method features may be shown in a particular arrangement and/or order. However, it should be understood that such a particular arrangement and/or order may not be required. In some embodiments, these features may be arranged in a manner and/or order different from that shown in the illustrative accompanying drawings. In addition, inclusion of the structure or method features in a particular figure does not imply that such features are required in all embodiments, and in some embodiments, these features may not be included or may be combined with other features.

Embodiments of a mechanism disclosed in this application may be implemented in hardware, software, firmware, or a combination of these implementation methods. Embodiments of this application may be implemented as a computer program or program code executed in a programmable system. The programmable system includes a plurality of processors, a storage system (including volatile and non-volatile memories and/or storage elements), a plurality of input devices, and a plurality of output devices.

The program code may be configured to input instructions, to perform functions described in this application and generate output information. The output information may be applied to one or more output devices in a known manner. For a purpose of this application, a processing system includes any system having a processor such as a digital signal processor (DSP), a microcontroller, an application-specific integrated circuit (ASIC), or a microprocessor.

The program code may be implemented in a high-level procedural language or an object-oriented programming language, to communicate with the processing system. The program code may alternatively be implemented by using an assembly language or a machine language when needed. Actually, the mechanisms described in this application are not limited to a scope of any particular programming language. In any case, the language may be a compiled language or an interpretive language.

In some cases, the disclosed embodiments may be implemented by hardware, firmware, software, or any combination thereof. In some cases, one or more aspects of at least some embodiments may be implemented by expressive instructions stored in a computer-readable storage medium. The instructions represent various logics in a processor, and when the instructions are read by a machine, the machine is enabled to manufacture logics for performing the technologies described in this application. These representations referred to as "IP cores" may be stored in a tangible computer-readable storage medium, and provided for a plurality of customers or production facilities for loading into a manufacturing machine that actually manufactures the logic or the processor.

Such a computer-readable storage media may include but is not limited to non-transient tangible arrangements of articles manufactured or formed by machines or devices. The computer-readable storage media includes storage media, for example, a hard disk or any other type of disk including a floppy disk, a compact disc, a compact disc read-only memory (CD-ROM), a compact disc rewritable (CD-RW), or a magneto-optical disc; a semiconductor device, for example, a read-only memory (ROM), a random access memory (RAM) such as a dynamic random access memory (DRAM) or a static random access memory (SRAM), an erasable programmable read-only memory (EPROM), a flash memory, or an electrically erasable programmable read-only memory (EEPROM); a phase change memory (PCM); a magnetic card or an optical card; or any other type of proper medium for storing electronic instructions.

Therefore, embodiments of this application further include a non-transient computer-readable storage medium. The medium includes instructions or design data, for example, a hardware description language (HDL), and defines a structure, a circuit, an apparatus, a processor, and/or a system feature described in this application.

What is claimed is:

1. A cell measurement method for user equipment, comprising:
   determining a first neighboring cell belonging to a first priority among neighboring cells of the user equipment and a second neighboring cell belonging to a second priority among the neighboring cells of the user equipment, wherein the first priority is lower than the second priority;
   measuring the first neighboring cell by using a first measurement policy, wherein a time interval between two adjacent measurements on the first neighboring cell is greater than one discontinuous reception (DRX) cycle; and
   measuring the second neighboring cell by using a second measurement policy, wherein the measuring the second neighboring cell by using a second measurement policy comprises measuring no more than a predetermined quantity of second neighboring cells.

2. The method according to claim 1, wherein before the determining a first neighboring cell belonging to a first priority among neighboring cells of the user equipment and a second neighboring cell belonging to a second priority among the neighboring cells of the user equipment, the method further comprises:
   obtaining information of a cell set related to the user equipment, wherein the cell set comprises a serving cell and a plurality of neighboring cells of the user equipment; and
   selecting at least two neighboring cells from the plurality of neighboring cells based on the information of the cell set; and
   wherein the determining a first neighboring cell belonging to a first priority among neighboring cells of the user equipment and a second neighboring cell belonging to a second priority among the neighboring cells of the user equipment comprises:
   determining the first neighboring cell and the second neighboring cell from the at least two neighboring cells.

3. The method according to claim 1, wherein the measuring the first neighboring cell by using a first measurement policy comprises measuring, within each measurement period, a preset quantity of neighboring cells selected from first neighboring cells for a preset quantity of times.

4. The method according to claim 1, wherein the first measurement policy comprises:
   when a quantity of first neighboring cells is greater than or equal to 2, the time interval is equal to N-1 DRX cycles, wherein N is the quantity of the first neighboring cells; or
   the time interval between the two adjacent measurements on the first neighboring cell is the same as or different from a time interval between other two adjacent measurements on the first neighboring cell.

5. The method according to claim 1, wherein the time interval is related to signal strength, greater signal strength indicates longer time interval between the two adjacent measurements on the first neighboring cell, and smaller signal strength indicates shorter time interval between the two adjacent measurements on the first neighboring cell.

6. The method according to claim 5, wherein that the time interval is related to signal strength comprises:
   when the signal strength is between a measurement start threshold and a middle threshold, determining that the time interval between the two adjacent measurements on the first neighboring cell is a first time interval, wherein the middle threshold is equal to an average value of the measurement start threshold and an escape threshold; and
   when the signal strength is between the middle threshold and the escape threshold, determining that the time interval between the two adjacent measurements on the first neighboring cell is a second time interval, wherein the first time interval is greater than the second time interval, wherein:

the measurement start threshold is set to start a cell measurement when the signal strength is less than the measurement start threshold, and the escape threshold is set to perform the cell measurement in a default manner when the signal strength is less than the escape threshold.

7. The method according to claim 5, wherein the method further comprises:

skipping a cell measurement when the signal strength is greater than a measurement start threshold; and measuring the first neighboring cell according to a third measurement interval when the signal strength is less than an escape threshold, wherein the third measurement interval is less than the time interval in the first measurement policy.

8. The method according to claim 2, wherein the method further comprises:

sorting cells in descending order of stability based on at least one of a length of camp-on duration of the user equipment in each cell, signal strength of each cell, or a quantity of connection handovers between the user equipment and each cell, wherein the cells comprise at least one of the serving cell or the plurality of neighboring cells, longer camp-on duration indicates higher stability of the cell, stronger signal strength indicates higher stability of the cell, and smaller quantity of the connection handovers indicates higher stability of the cell; and wherein the selecting at least two neighboring cells from the plurality of neighboring cells comprises selecting, from the plurality of neighboring cells, a preset quantity of top-ranking neighboring cells in descending order of stability.

9. The method according to claim 1, wherein the measuring no more than a predetermined quantity of second neighboring cells comprises:

comparing a quantity of the second neighboring cells with a first quantity;

when the quantity of the second neighboring cells is greater than the first quantity, determining the first quantity of second neighboring cells from the second neighboring cell for a measurement, wherein the predetermined quantity is equal to the first quantity; and when the quantity of the second neighboring cells is less than or equal to the first quantity, performing a measurement on all the second neighboring cells, wherein the predetermined quantity is the quantity of the second neighboring cells.

10. The method according to claim 1, further comprising:

determining that a location of the user equipment changes, a serving cell of the user equipment changes, or signal strength of a signal received through the serving cell is less than a threshold; and if a cell measurement policy is not obtained within a predetermined time period, measuring the first neighboring cell within a plurality of DRX cycles, and determining, based on a quantity of neighboring cells, a measurement interval for measuring the first neighboring cell.

11. The method according to claim 1, wherein:

the measuring the first neighboring cell by using a first measurement policy further comprises measuring, in a power saving mode, the first neighboring cell by using the first measurement policy; and the measuring the second neighboring cell by using a second measurement policy further comprises measuring, in the power saving mode, the second neighboring cell by using the second measurement policy.

12. A user equipment, comprising:

a memory comprising instructions; and one or more processors in communication with the memory, wherein the one or more processors execute the instructions to enable the user equipment to perform:

determining a first neighboring cell belonging to a first priority among neighboring cells of the user equipment and a second neighboring cell belonging to a second priority among the neighboring cells of the user equipment, wherein the first priority is lower than the second priority;

measuring the first neighboring cell by using a first measurement policy, wherein a time interval between two adjacent measurements on the first neighboring cell is greater than one discontinuous reception (DRX) cycle; and measuring the second neighboring cell by using a second measurement policy, wherein the measuring the second neighboring cell by using a second measurement policy comprises measuring no more than a predetermined quantity of second neighboring cells.

13. The user equipment according to claim 12, wherein before the determining a first neighboring cell belonging to a first priority among neighboring cells of the user equipment and a second neighboring cell belonging to a second priority among the neighboring cells of the user equipment, the user equipment is further enabled to perform:

obtaining information of a cell set related to the user equipment, wherein the cell set comprises a serving cell and a plurality of neighboring cells of the user equipment; and selecting at least two neighboring cells from the plurality of neighboring cells based on the information of the cell set; and wherein the determining a first neighboring cell belonging to a first priority among neighboring cells of the user equipment and a second neighboring cell belonging to a second priority among the neighboring cells of the user equipment comprises:

determining the first neighboring cell and the second neighboring cell from the at least two neighboring cells.

14. The user equipment according to claim 12, wherein the measuring the first neighboring cell by using a first measurement policy comprises measuring, within each measurement period, a preset quantity of neighboring cells selected from first neighboring cells for a preset quantity of times.

15. The user equipment according to claim 12, wherein the first measurement policy comprises:

when a quantity of first neighboring cells is greater than or equal to 2, the time interval is equal to N-1 DRX cycles, wherein N is the quantity of the first neighboring cells; or the time interval between the two adjacent measurements on the first neighboring cell is the same as or different from a time interval between other two adjacent measurements on the first neighboring cell.

16. The user equipment according to claim 12, wherein the time interval is related to signal strength, greater signal strength indicates longer time interval between the two adjacent measurements on the first neighboring cell, and smaller signal strength indicates shorter time interval between the two adjacent measurements on the first neighboring cell.

17. The user equipment according to claim 16, wherein that the time interval is related to signal strength comprises:
   when the signal strength is between a measurement start threshold and a middle threshold, determining that the time interval between the two adjacent measurements on the first neighboring cell is a first time interval, wherein the middle threshold is equal to an average value of the measurement start threshold and an escape threshold; and
   when the signal strength is between the middle threshold and the escape threshold, determining that the time interval between the two adjacent measurements on the first neighboring cell is a second time interval, wherein the first time interval is greater than the second time interval, wherein:
   the measurement start threshold is set to start a cell measurement when the signal strength is less than the measurement start threshold, and the escape threshold is set to perform the cell measurement in a default manner when the signal strength is less than the escape threshold.

18. The user equipment according to claim 16, wherein the user equipment is further enabled to perform:
   skipping a cell measurement when the signal strength is greater than a measurement start threshold; and
   measuring the first neighboring cell according to a third measurement interval when the signal strength is less than an escape threshold, wherein the third measurement interval is less than the time interval in the first measurement policy.

19. The user equipment according to claim 13, wherein the user equipment is further enabled to perform:
   sorting cells in descending order of stability based on at least one of a length of camp-on duration of the user equipment in each cell, signal strength of each cell, or a quantity of connection handovers between the user equipment and each cell, wherein the cells comprise at least one of the serving cell or the plurality of neighboring cells, longer camp-on duration indicates higher stability of the cell, stronger signal strength indicates higher stability of the cell, and smaller quantity of the connection handovers indicates higher stability of the cell; and
   wherein the selecting at least two neighboring cells from the plurality of neighboring cells comprises selecting, from the plurality of neighboring cells, a preset quantity of top-ranking neighboring cells in descending order of stability.

20. The user equipment according to claim 12, wherein the measuring no more than a predetermined quantity of second neighboring cells comprises:
   comparing a quantity of the second neighboring cells with a first quantity;
   when the quantity of the second neighboring cells is greater than the first quantity, determining the first quantity of second neighboring cells from the second neighboring cell for a measurement, wherein the predetermined quantity is equal to the first quantity; and
   when the quantity of the second neighboring cells is less than or equal to the first quantity, performing a measurement on all the second neighboring cells, wherein the predetermined quantity is the quantity of the second neighboring cells.

\* \* \* \* \*